US010484910B2

(12) United States Patent
Li et al.

(10) Patent No.: US 10,484,910 B2
(45) Date of Patent: Nov. 19, 2019

(54) TRAFFIC FLOW SPLITTING METHOD AND APPARATUS

(71) Applicant: HUAWEI TECHNOLOGIES CO., LTD., Shenzhen, Guangdong (CN)

(72) Inventors: Huan Li, Shanghai (CN); Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/699,145

(22) Filed: Sep. 8, 2017

(65) Prior Publication Data
US 2018/0014226 A1 Jan. 11, 2018

Related U.S. Application Data

(63) Continuation of application No. PCT/CN2015/073933, filed on Mar. 10, 2015.

(51) Int. Cl.
H04W 28/08 (2009.01)
H04L 12/891 (2013.01)
H04W 76/16 (2018.01)
H04W 88/06 (2009.01)

(52) U.S. Cl.
CPC .......... H04W 28/085 (2013.01); H04L 47/41 (2013.01); H04W 28/08 (2013.01); H04W 76/16 (2018.02); H04W 88/06 (2013.01)

(58) Field of Classification Search
None
See application file for complete search history.

(56) References Cited

U.S. PATENT DOCUMENTS

2007/0268855 A1 11/2007 Grayson et al.
2013/0250881 A1 9/2013 Liao et al.
(Continued)

FOREIGN PATENT DOCUMENTS

CN 102209030 A 10/2011
CN 102215530 A 10/2011
(Continued)

OTHER PUBLICATIONS

Extended European Search Report dated Feb. 1, 2018 in corresponding European Patent Application No. 15884228.6, 8 pgs.
(Continued)

Primary Examiner — Rebecca E Song
(74) Attorney, Agent, or Firm — Slater Matsil, LLP

(57) ABSTRACT

Embodiments of the present invention provide a traffic flow splitting method and apparatus. In a process of accessing a 3GPP network by UE, an eNB in the 3GPP network sends a first multiflow aggregation instruction to the UE, to instruct the UE to establish a first multiflow aggregation channel between the UE and the eNB via a non-3GPP network. The UE establishes the first multiflow aggregation channel. The first multiflow aggregation channel is used for transmitting a part of data in a downlink traffic flow for the UE, where the part of data is offloaded to the non-3GPP network for transmission, and other data in the downlink traffic flow is offloaded to a 3GPP channel for transmission. In the method, different data packets in a same traffic flow can be simultaneously transmitted in the 3GPP network and the non-3GPP network.

10 Claims, 15 Drawing Sheets

(56) References Cited

U.S. PATENT DOCUMENTS

| | | | |
|---|---|---|---|
| 2014/0079007 A1 | 3/2014 | Li et al. | |
| 2014/0112135 A1 | 4/2014 | Huang et al. | |
| 2014/0208072 A1 | 7/2014 | Cadambi et al. | |
| 2014/0369329 A1 | 12/2014 | Lee et al. | |
| 2015/0264726 A1* | 9/2015 | Zhu | H04W 28/065 370/329 |
| 2015/0351079 A1* | 12/2015 | Himayat | H04W 28/08 370/329 |
| 2016/0309319 A1* | 10/2016 | Gao | H04W 8/082 |
| 2017/0265241 A1* | 9/2017 | Fujishiro | H04W 16/14 |

FOREIGN PATENT DOCUMENTS

| | | |
|---|---|---|
| CN | 102523605 A | 6/2012 |
| CN | 102904856 A | 1/2013 |
| CN | 104205055 A | 12/2014 |
| CN | 2831733 B1 | 2/2015 |
| EP | 2723134 A1 | 4/2014 |
| EP | 3174338 A1 | 5/2017 |
| JP | 2014518044 A | 7/2014 |
| JP | 2016523482 A | 8/2016 |
| WO | 2014/060543 A1 | 4/2014 |
| WO | 2014204716 A2 | 12/2014 |
| WO | 2015030483 A1 | 3/2015 |

OTHER PUBLICATIONS

International Search Report dated Nov. 25, 2015 in corresponding International Patent Application No. PCT/CN2015/073933.

3GPP TS 36.300 V12.4.0; $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN), "Overall description; Stage 2 (Release 12)," Sophia Antipolis, France, Dec. 2014, pp. 1-251.

International Search Report dated Nov. 25, 2015 in corresponding International Patent Application PCT/CN2015/073933.

XP050927575, 3GPP TS 36.331 V12.4.1 (Dec. 2014), "3rd Generation Partnership Project; Technical Specification Group Radio Access Network; Evolved Universal Terrestrial Radio Access (E-UTRA); Radio Resource Control (RRC); Protocol specification (Release 12)," pp. 1-410.

Communication Pursuant to Article 94(3) EPC, dated Dec. 10, 2018, in European Application No. 15884228.6 (7 pp.).

Ericsson "Architecture Options for LTE-WLAN Radio Level Integration", 3GPP TSG-RAN#67, RP-150307, Internet <URL:http://www.3gpp.org/ftp/tsg_ran/TSG_RAN/TSGR_67/Docs/RP-150307.zip>, Mar. 9-12, 2015. (3 pgs.)

Ohta et al., "Proposal of link layer structure for LTE-WLAN aggregation in LTE-Advanced/5G network", IEICE Technical Report, vol. 114, No. 477, Japan, The Institute of Electronics, Information and Communication Engineers, (6 pgs.).

CMCC, "Consideration on the QoS guarantee in LTE-WLAN aggregation", 3GPP TSG-RAN WG2 #91 R2-153212, Internet <URL:http://www.3gpp.org/ftp/tsg_ran/WG2_RL2/TSGR2_91/Docs/R2-153212.zip>, Aug. 24-28, 2015. (3 pgs.).

Notice of Reasons for Rejection dated Feb. 18, 2019 in corresponding Japanese Patent Application No. 2017-547563.

Notice of Reasons for Rejection, dated Oct. 22, 2018, in Japanese Application No. 2017547563 (6 pp.).

* cited by examiner

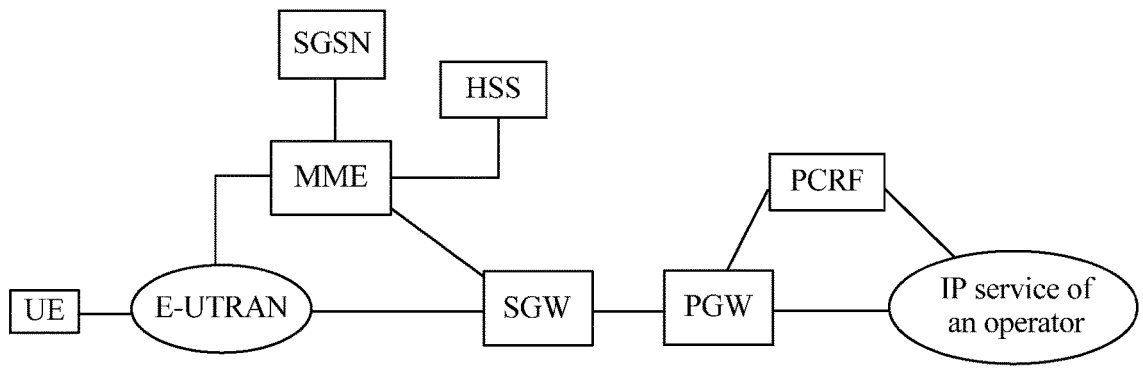

FIG. 1

UE receives a first multiflow aggregation instruction sent by an eNB in a 3GPP network, where the first multiflow aggregation instruction is used to instruct the UE to establish a first multiflow aggregation channel between the UE and the eNB via a non-3GPP network, the first multiflow aggregation channel is used for transmitting a part of data in an uplink traffic flow of the UE or a part of data in a downlink traffic flow for the UE, where the part of data is offloaded to the non-3GPP network for transmission, and other data in the uplink traffic flow or other data in the downlink traffic flow is offloaded to a 3GPP channel that is in the 3GPP network and that is between the UE and the eNB for transmission ⎯ 101

UE establishes the first multiflow aggregation channel ⎯ 102

The UE splits the uplink traffic flow of the UE into a first uplink data flow and a second uplink data flow, sends the first uplink data flow to the eNB by using the 3GPP channel, and sends the second uplink data flow to the eNB by using the first multiflow aggregation channel, so that the eNB aggregates the first uplink data flow with the second uplink data flow to form one traffic flow; or the UE receives a first downlink data flow sent by the eNB by using the 3GPP channel, receives a second downlink data flow sent by the eNB by using the first multiflow aggregation channel, and aggregates the first downlink data flow with the second downlink data flow to form one traffic flow, where the downlink traffic flow for the UE is divided by the eNB into the first downlink data flow and the second downlink data flow ⎯ 103

FIG. 2

```
┌─────────────────────────────────────────────────────┐
│    A multiflow aggregation gateway receives a first multiflow    │
│ aggregation channel establishment request sent by UE, where the  │
│  first multiflow aggregation channel establishment request includes │
│    a second multiflow aggregation instruction and an identifier of the │
│   UE, the second multiflow aggregation instruction is used to instruct │
│     the multiflow aggregation gateway to establish a first multiflow │
│       aggregation channel between the UE and an eNB in a 3GPP    │
│      network, and the first multiflow aggregation channel is used for │── 401
│       transmitting a part of data in an uplink traffic flow of the UE or a │
│       part of data in a downlink traffic flow for the UE, where the part of │
│        data is offloaded to a non-3GPP network for transmission, and │
│         other data in the uplink traffic flow or other data in the downlink │
│           traffic flow is offloaded to a 3GPP channel that is in the 3GPP │
│     network and that is between the UE and the eNB for transmission │
└─────────────────────────────────────────────────────┘
                              │
                              ▼
┌─────────────────────────────────────────────────────┐
│         The multiflow aggregation gateway returns a first multiflow │
│   aggregation channel establishment response to the UE, to confirm │── 402
│          that the first multiflow aggregation channel is successfully │
│                          established                 │
└─────────────────────────────────────────────────────┘
                              │
                              ▼
┌─────────────────────────────────────────────────────┐
│    The multiflow aggregation gateway receives a second uplink data │
│      flow sent by the UE by using a first subchannel, and sends the │
│   second uplink data flow to the eNB by using a second subchannel, │
│    where the uplink traffic flow of the UE is divided by the UE into the │
│       second uplink data flow and a first uplink data flow, and the first │
│          uplink data flow is sent to the eNB by using the 3GPP channel; or │
│        the multiflow aggregation gateway receives a second downlink │── 403
│           data flow sent by the eNB by using a second subchannel, and │
│           sends the second downlink data flow to the UE by using a first │
│   subchannel, where the downlink traffic flow for the UE is divided by │
│       the eNB into a first downlink data flow and the second downlink │
│          data flow, and the first downlink data flow is sent to the eNB by │
│                       using the 3GPP channel        │
└─────────────────────────────────────────────────────┘
```

FIG. 5

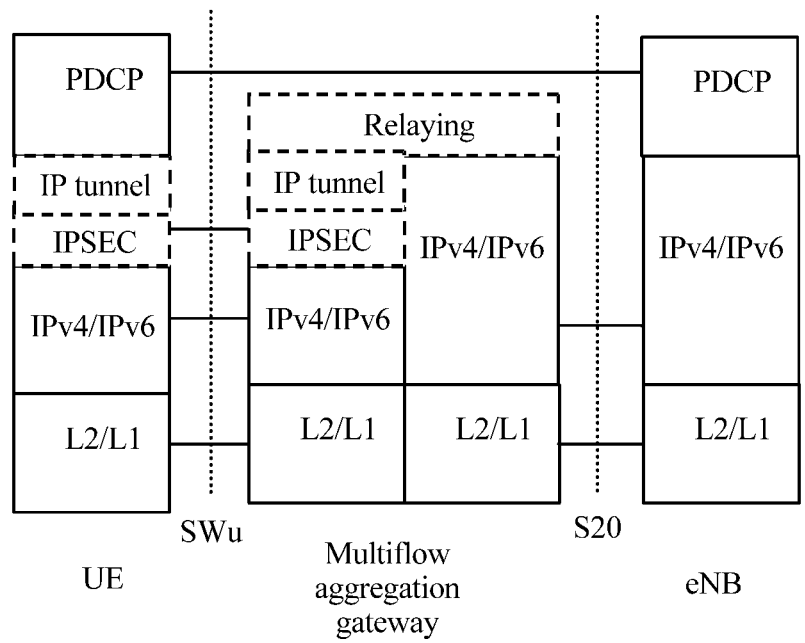
(a)
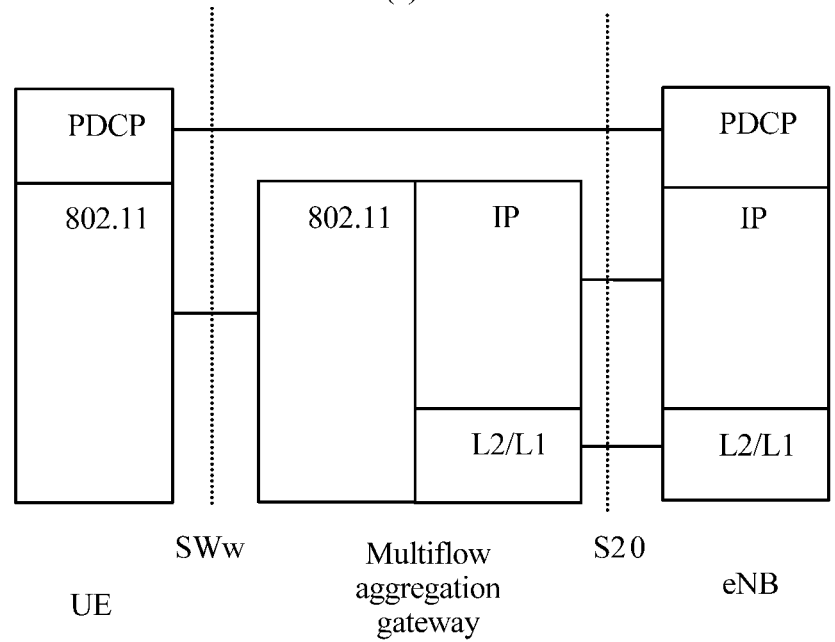
(b)
FIG. 9

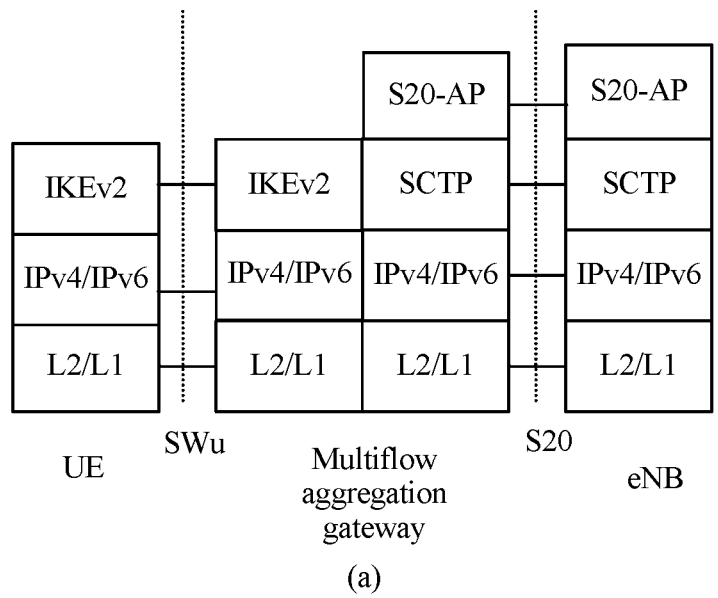
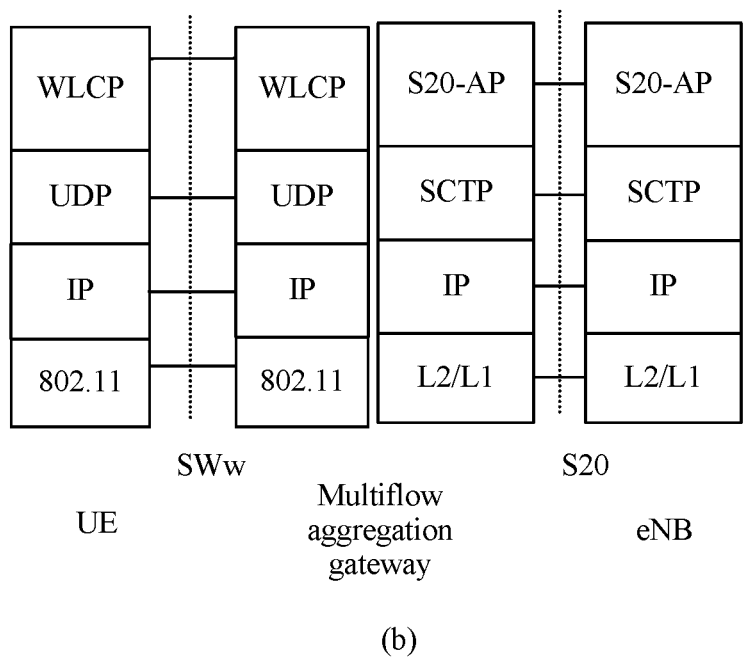
FIG. 11

TRAFFIC FLOW SPLITTING METHOD AND APPARATUS

CROSS-REFERENCE TO RELATED APPLICATIONS

This application is a continuation of International Application No. PCT/CN2015/073933, filed on Mar. 10, 2015, the disclosure of which is hereby incorporated by reference in its entirety.

TECHNICAL FIELD

The present disclosure relates to communications technologies, and in particular, to a traffic flow splitting method and apparatus.

BACKGROUND

Operators are facing a rapid increase in traffic of data traffic flows. However, operators can provide limited bandwidth resources, and how to use limited bandwidth to provide a service for traffic that increases rapidly becomes an urgent problem to be resolved by the operators.

Currently, a flow mobility method based on the Proxy Mobile IP (PMIP for short)/GPRS tunneling protocol (GTP for short) is being made. In the flow mobility method based on the GTP/PMIP, different traffic flows on a same packet data network (PDN for short) connection may be separately transmitted between a 3rd Generation Partnership Project (3GPP for short) 3GPP network and a non-3GPP network, and a same traffic flow may be switched between the 3GPP network and the non-3GPP network. Specifically, the 3GPP standard protocol supports user equipment (UE for short) in simultaneously accessing a 3GPP network and a non-3GPP network. In addition, the UE may simultaneously access a same PDN connection by using the 3GPP network and the non-3GPP network, that is, different data flows on a same PDN connection may be distributed in a 3GPP system and a non-3GPP system and transmitted separately. For example, if the UE has both a video service and a voice service on a same PDN connection, the video service may be transmitted by using the non-3GPP network, and the voice service may be transmitted by using the 3GPP network. In comparison with a case in which both the video service and the voice service are transmitted in the 3GPP network or the non-3GPP network, bandwidth of the video service and the voice service can be increased, and network resource utilization can be improved.

However, in the prior art, data packets in a same traffic flow can be transmitted only in one access network, that is, a same traffic flow is transmitted in either the 3GPP network or the non-3GPP network. When the UE has only one traffic flow, bandwidth of the UE cannot be increased. In addition, when a traffic flow is switched between the two networks, multiple pieces of signaling are exchanged between the UE and a network side. Consequently, a traffic flow switching time is delayed.

SUMMARY

Embodiments of the present invention provide a traffic flow splitting method and apparatus, so that different data packets in a same traffic flow can be simultaneously transmitted in a 3GPP network and a non-3GPP network, air-interface bandwidth is effectively increased, and resource utilization is improved.

A first aspect of the present invention provides a traffic flow splitting method, including:

receiving, by UE, a first multiflow aggregation instruction sent by an evolved NodeB eNB in a 3GPP network, where the first multiflow aggregation instruction is used to instruct the UE to establish a first multiflow aggregation channel between the UE and the eNB via a non-3GPP network, the first multiflow aggregation channel is used for transmitting a part of data in an uplink traffic flow of the UE or a part of data in a downlink traffic flow for the UE, where the part of data is offloaded to the non-3GPP network for transmission, and other data in the uplink traffic flow or other data in the downlink traffic flow is offloaded to a 3GPP channel that is in the 3GPP network and that is between the UE and the eNB for transmission; and establishing, by the UE, the first multiflow aggregation channel.

With reference to the first aspect of the present invention, in a first possible implementation of the first aspect of the present invention, the method further includes:

splitting, by the UE, the uplink traffic flow of the UE into a first uplink data flow and a second uplink data flow, sending the first uplink data flow to the eNB by using the 3GPP channel, and sending the second uplink data flow to the eNB by using the first multiflow aggregation channel, so that the eNB aggregates the first uplink data flow with the second uplink data flow to form one traffic flow; or receiving, by the UE, a first downlink data flow sent by the eNB by using the 3GPP channel, receiving a second downlink data flow sent by the eNB by using the first multiflow aggregation channel, and aggregating the first downlink data flow with the second downlink data flow to form one traffic flow, where the downlink traffic flow for the UE is split by the eNB into the first downlink data flow and the second downlink data flow.

With reference to the first aspect of the present invention or the first possible implementation of the first aspect of the present invention, in a second possible implementation of the first aspect of the present invention, the first multiflow aggregation channel includes a first subchannel between the UE and a multiflow aggregation gateway and a second subchannel between the multiflow aggregation gateway and the eNB, and the establishing, by the UE, the first multiflow aggregation channel includes:

obtaining, by the UE, an IP address of the multiflow aggregation gateway;

sending, by the UE, a first multiflow aggregation channel establishment request to the multiflow aggregation gateway according to the IP address of the multiflow aggregation gateway, where the first multiflow aggregation channel establishment request includes a second multiflow aggregation instruction and an identifier of the UE, the second multiflow aggregation instruction is used to instruct the multiflow aggregation gateway to establish the first multiflow aggregation channel, and the identifier of the UE is an identifier of the UE in the 3GPP network;

receiving, by the UE, a first multiflow aggregation channel establishment response returned by the multiflow aggregation gateway, to confirm that the multiflow aggregation channel is successfully established; and sending, by the UE, a notification message to the eNB, where the notification message is used to notify the eNB that the first multiflow aggregation channel is successfully established.

With reference to the third possible implementation of the first aspect of the present invention, in a third possible implementation of the first aspect of the present invention, the obtaining, by the UE, an IP address of the multiflow aggregation gateway includes:

receiving, by the UE in a radio resource control RRC connection establishment process, an RRC message sent by the eNB, and obtaining the IP address of the multiflow aggregation gateway according to the RRC message, where the RRC message includes the IP address of the multiflow aggregation gateway or an identifier of the multiflow aggregation gateway; or receiving, by the UE in an access authentication and authorization of accessing the non-3GPP network, an authentication message sent by the non-3GPP network, and obtaining the IP address of the multiflow aggregation gateway according to the authentication message, where the authentication message includes the IP address of the multiflow aggregation gateway or an identifier of the multiflow aggregation gateway; or sending, by the UE, a fully-qualified domain name request to a domain name server, and receiving a fully-qualified domain name response returned by the domain name server, where the fully-qualified domain name request is used for obtaining the IP address of the multiflow aggregation gateway, and the fully-qualified domain name response includes the IP address of the multiflow aggregation gateway.

With reference to the first aspect of the present invention or the first possible implementation of the first aspect of the present invention, in a fourth possible implementation of the first aspect of the present invention, the first multiflow aggregation channel includes a third subchannel between the UE and the eNB, and the establishing, by the UE, the first multiflow aggregation channel includes:

obtaining, by the UE, an IP address of the eNB;

sending, by the UE, a second multiflow aggregation channel establishment request to the eNB according to the IP address of the eNB, where the second multiflow aggregation channel establishment request includes a third multiflow aggregation instruction and an identifier of the UE, the third multiflow aggregation instruction is used to instruct the eNB to establish the first multiflow aggregation channel, and the identifier of the UE is an identifier of the UE in the 3GPP network; and receiving, by the UE, a second multiflow aggregation channel establishment response returned by the eNB, to confirm that the first multiflow aggregation channel is successfully established.

With reference to any one of the first to the third possible implementations of the first aspect of the present invention, in a fifth possible implementation of the first aspect of the present invention, the sending the second uplink data flow to the eNB by using the first multiflow aggregation channel includes:

adding, by the UE to the second uplink data flow, a bearer identifier corresponding to the uplink traffic flow, and sending the second uplink data flow to the eNB by using the first multiflow aggregation channel, where the second uplink data flow includes the bearer identifier corresponding to the uplink traffic flow; or adding, by the UE to the second uplink data flow, the identifier of the UE and a bearer identifier corresponding to the uplink traffic flow, and sending the second uplink data flow to the eNB by using the first multiflow aggregation channel, where the second uplink data flow includes the identifier of the UE and the bearer identifier corresponding to the uplink traffic flow, and the identifier of the UE is the identifier of the UE in the 3GPP network; or encapsulating, by the UE, a data packet in the second uplink data flow by using a first Media Access Control MAC address, and sending the encapsulated second uplink data flow to the eNB by using the first multiflow aggregation channel, where the second uplink data flow includes the first MAC address, and the first MAC address is a MAC address corresponding to a bearer corresponding to the uplink traffic flow; or encapsulating, by the UE, a data packet in the second uplink data flow by using a second MAC address, adding, to the encapsulated second uplink data flow, a bearer identifier corresponding to the uplink traffic flow, and sending the second uplink data flow to the eNB by using the first multiflow aggregation channel, where the second uplink data flow includes the second MAC address and the bearer identifier corresponding to the uplink traffic flow, and the second MAC address is a MAC address corresponding to a packet data network PDN connection corresponding to the uplink traffic flow.

With reference to any one of the first to the third possible implementations of the first aspect of the present invention, in a sixth possible implementation of the first aspect of the present invention, the second downlink data flow that is sent by the eNB by using the first multiflow aggregation channel and is received by the UE includes a bearer identifier corresponding to the downlink traffic flow, or the identifier of the UE and a bearer identifier corresponding to the downlink traffic flow, or a first MAC address, or a second MAC address and a bearer identifier corresponding to the downlink traffic flow, the identifier of the UE is the identifier of the UE in the 3GPP network, the first MAC address is a MAC address corresponding to a bearer corresponding to the downlink traffic flow, and the second MAC address is a MAC address corresponding to a packet data network PDN connection corresponding to the downlink traffic flow.

With reference to the sixth possible implementation of the first aspect of the present invention, in a seventh possible implementation of the first aspect of the present invention, before the aggregating, by the UE, the first downlink data flow with the second downlink data flow to form one traffic flow, the method further includes:

determining, by the UE according to information included in the second downlink data flow, a bearer corresponding to the second downlink data flow, where the information included in the second downlink data flow is the bearer identifier corresponding to the downlink traffic flow, or the identifier of the UE and the bearer identifier corresponding to the downlink traffic flow, or the first MAC address, or the second MAC address and the bearer identifier corresponding to the downlink traffic flow; and determining, by the UE, that a bearer corresponding to the first downlink data flow and the bearer corresponding to the second downlink data flow are a same bearer.

With reference to any one of the first to the third possible implementations of the first aspect of the present invention, in an eighth possible implementation of the first aspect of the present invention, the method further includes:

receiving, by the UE, a traffic flow template sent by a mobility management entity MME in the 3GPP network, where the traffic flow template is corresponding to a bearer corresponding to the downlink traffic flow, each bearer is corresponding to one traffic flow template, and the traffic flow template includes matching information of the bearer corresponding to the downlink traffic flow; and before the aggregating, by the UE, the first downlink data flow with the second downlink data flow to form one traffic flow, the method further includes:

matching, by the UE, the second downlink data flow and the traffic flow template, to determine a bearer corresponding to the second downlink data flow; and determining, by the UE, that a bearer corresponding to the first downlink data flow and a bearer corresponding to the second downlink data flow passes are a same bearer.

With reference to any one of the first aspect of the present invention to the eighth possible implementation of the first aspect of the present invention, in a ninth possible implementation of the first aspect of the present invention, after the UE establishes a dedicated bearer, the method further includes:

receiving, by the UE, a fourth multiflow aggregation instruction sent by the eNB, where the fourth multiflow aggregation instruction is used to instruct the UE to establish, for the dedicated bearer, a second multiflow aggregation channel between the UE and the eNB via the non-3GPP network, the second multiflow aggregation channel is used for transmitting a part of data in an uplink traffic flow transmitted on the dedicated bearer or a part of data in a downlink traffic flow transmitted on the dedicated bearer, where the part of data is offloaded to the non-3GPP network for transmission, and other data in the uplink traffic flow transmitted on the dedicated bearer or other data in the downlink traffic flow transmitted on the dedicated bearer is offloaded to the 3GPP channel for transmission; and establishing, by the UE, the second multiflow aggregation channel.

With reference to the first aspect of the present invention, in a tenth possible implementation of the first aspect of the present invention, before the receiving, by UE, the first multiflow aggregation instruction sent by the eNB, the method further includes:

sending, by the UE, multiflow aggregation capability information of the UE to the eNB, so that the eNB determines, according to the multiflow aggregation capability information, to return the first multiflow aggregation instruction to the UE, where the multiflow aggregation capability information is used to indicate that the UE supports a multiflow aggregation capability.

A second aspect of the present invention provides a traffic flow splitting method, including:

sending, by an evolved NodeB eNB, a first multiflow aggregation instruction to UE, where the first multiflow aggregation instruction is used to instruct the UE to establish a first multiflow aggregation channel between the UE and the eNB via a non-3GPP network, the first multiflow aggregation channel is used for offloading a part of data in an uplink traffic flow of the UE or a part of data in a downlink traffic flow for the UE to the non-3GPP network for transmission, and other data in the uplink traffic flow or other data in the downlink traffic flow is offloaded to a 3GPP channel that is in a 3GPP network and that is between the UE and the eNB for transmission; and establishing, by the eNB, the first multiflow aggregation channel.

With reference to the second aspect of the present invention, in a first possible implementation of the second aspect of the present invention, after the establishing the first multiflow aggregation channel, the method further includes:

receiving, by the eNB, a first uplink data flow sent by the UE by using the 3GPP channel, receiving a second uplink data flow sent by the UE by using the first multiflow aggregation channel, aggregating the first uplink data flow with the second uplink data flow to form one traffic flow, and sending the traffic flow, where the uplink traffic flow of the UE is split by the UE into the first uplink data flow and the second uplink data flow; or receiving, by the eNB, a downlink traffic flow sent by a core network of the 3GPP network, splitting the downlink traffic flow into a first downlink data flow and a second downlink data flow, sending the first downlink data flow to the UE by using the 3GPP channel, and sending the second downlink data flow to the UE by using the first multiflow aggregation channel, so that the UE aggregates the first downlink data flow with the second downlink data flow to form one traffic flow.

With reference to the first possible implementation of the second aspect of the present invention, in a second possible implementation of the second aspect of the present invention, the second uplink data flow that is sent by the UE by using the multiflow aggregation channel and is received by the eNB includes a bearer identifier corresponding to the uplink traffic flow, or an identifier of the UE and a bearer identifier corresponding to the uplink traffic flow, or a first MAC address, or a second MAC address and a bearer identifier corresponding to the uplink traffic flow, the identifier of the UE is an identifier of the UE in the 3GPP network, the first MAC address is a MAC address corresponding to a bearer corresponding to the uplink traffic flow, and the second MAC address is a MAC address corresponding to a packet data network PDN connection corresponding to the uplink traffic flow.

With reference to the second possible implementation of the second aspect of the present invention, in a third possible implementation of the second aspect of the present invention, before the aggregating, by the eNB, the first uplink data flow with the second uplink data flow to form one traffic flow, and sending the traffic flow, the method further includes:

determining, by the eNB according to information included in the second uplink data flow, a bearer corresponding to the second uplink data flow, where the information included in the second uplink data flow is the bearer identifier corresponding to the uplink traffic flow, or the identifier of the UE and the bearer identifier corresponding to the uplink traffic flow, or the first MAC address, or the second MAC address and the bearer identifier corresponding to the uplink traffic flow; and determining, by the eNB, that a bearer corresponding to the first uplink data flow and the bearer corresponding to the second uplink data flow are a same bearer.

With reference to the first possible implementation of the second aspect of the present invention, in a fourth possible implementation of the second aspect of the present invention, the sending the second downlink data flow to the UE by using the first multiflow aggregation channel includes:

adding, by the eNB to the second downlink data flow, a bearer identifier corresponding to the downlink traffic flow, and sending the second downlink data flow to the UE by using the first multiflow aggregation channel, where the second downlink data flow includes the bearer identifier corresponding to the downlink traffic flow; or adding, by the eNB to the second downlink data flow, an identifier of the UE and a bearer identifier corresponding to the downlink traffic flow, and sending the second downlink data flow to the UE by using the first multiflow aggregation channel, where the second downlink data flow includes the identifier of the UE and the bearer identifier corresponding to the downlink traffic flow, and the identifier of the UE is an identifier of the UE in the 3GPP network; or encapsulating, by the eNB, a data packet in the second downlink data flow by using a first Media Access Control MAC address, and sending the encapsulated second downlink data flow to the UE by using the first multiflow aggregation channel, where the second downlink data flow includes the first MAC address, and the first MAC address is a MAC address corresponding to a bearer corresponding to the downlink traffic flow; or encapsulating, by the eNB, a data packet in the second downlink data flow by using a second MAC address, adding, to the encapsulated second downlink data flow, a bearer identifier corresponding to the downlink traffic flow, and sending the second downlink data flow to the UE by using the first multiflow aggregation channel, where the second downlink data flow includes the second MAC address and the bearer identifier corresponding to the downlink traffic flow, and the second MAC address is a MAC address corresponding to a packet data network PDN connection corresponding to the downlink traffic flow.

With reference to the first possible implementation of the second aspect of the present invention, in a fifth possible implementation of the second aspect of the present invention, the method further includes: receiving, by the eNB, a traffic flow template sent by a mobility management entity MME, where the traffic flow template is corresponding to a bearer corresponding to the uplink traffic flow, each bearer is corresponding to one traffic flow template, and the traffic flow template includes matching information of the bearer corresponding to the uplink traffic flow; and before the aggregating, by the eNB, the first uplink data flow with the second uplink data flow to form one traffic flow, and sending the traffic flow, the method further includes:

matching, by the eNB, the second uplink data flow and the traffic flow template, to determine a bearer corresponding to the second uplink data flow; and determining, by the eNB, that the bearer corresponding to the second uplink data flow and a bearer corresponding to the first uplink data flow are a same bearer.

With reference to the first to the third possible implementations of the second aspect of the present invention, in a sixth possible implementation of the second aspect of the present invention, the first multiflow aggregation channel includes a first subchannel between the UE and a multiflow aggregation gateway and a second subchannel between the multiflow aggregation gateway and the eNB, and the establishing, by the UE, the first multiflow aggregation channel includes:

receiving, by the eNB, a third multiflow aggregation channel establishment request sent by the multiflow aggregation gateway, where the third multiflow aggregation channel establishment request is sent by the multiflow aggregation gateway to the eNB after the multiflow aggregation gateway receives a first multiflow aggregation channel establishment request sent by the UE, the first multiflow aggregation channel establishment request includes the identifier of the UE and a second multiflow aggregation instruction, the second multiflow aggregation instruction is used to instruct the multiflow aggregation gateway to establish the first multiflow aggregation channel, the third multiflow aggregation channel establishment request includes the identifier of the UE, a bearer identifier corresponding to the second subchannel, an endpoint identifier of a tunnel allocated to a bearer corresponding to the second subchannel, and the second multiflow aggregation instruction, and the identifier of the UE is the identifier of the UE in the 3GPP network;

returning, by the eNB, a second multiflow aggregation channel establishment response to the multiflow aggregation gateway, to determine that the second subchannel is successfully established, so that the multiflow aggregation gateway returns a first multiflow aggregation channel establishment response to the UE according to the second multiflow aggregation channel establishment response, to confirm that the first subchannel is successfully established; and receiving a notification message sent by the UE, where the notification message is used to notify the eNB that the first multiflow aggregation channel is successfully established, and the notification message is sent by the UE to the eNB after the UE receives the first multiflow aggregation channel establishment response.

With reference to the first to the third possible implementations of the second aspect of the present invention, in a seventh possible implementation of the second aspect of the present invention, the first multiflow aggregation channel includes a third subchannel between the UE and the eNB, and the establishing, by the UE, the first multiflow aggregation channel includes:

receiving, by the eNB, a second multiflow aggregation channel establishment request sent by the UE, where the second multiflow aggregation channel establishment request includes a second multiflow aggregation instruction and the identifier of the UE, the second multiflow aggregation instruction is used to instruct the eNB to establish the third subchannel, and the identifier of the UE is the identifier of the UE in the 3GPP network; and returning, by the eNB, a second multiflow aggregation channel establishment response to the UE, to confirm that the third subchannel is successfully established.

With reference to the second aspect of the present invention, in an eighth possible implementation of the second aspect of the present invention, after the UE establishes a dedicated bearer, the method further includes:

sending, by the eNB, a third multiflow aggregation instruction to the UE, where the third multiflow aggregation instruction is used to instruct the UE to establish, for the dedicated bearer, a second multiflow aggregation channel between the UE and the eNB via the non-3GPP network, the second multiflow aggregation channel is used for transmitting a part of data in an uplink traffic flow transmitted on the dedicated bearer or a part of data in a downlink traffic flow transmitted on the dedicated bearer, where the part of data is offloaded to the non-3GPP network for transmission, and other data in the uplink traffic flow transmitted on the dedicated bearer or other data in the downlink traffic flow transmitted on the dedicated bearer is offloaded to the 3GPP channel for transmission; and establishing, by the eNB, the second multiflow aggregation channel.

A third aspect of the present invention provides a traffic flow splitting method, including:

receiving, by a multiflow aggregation gateway, a first multiflow aggregation channel establishment request sent by UE, where the first multiflow aggregation channel establishment request includes a second multiflow aggregation instruction and an identifier of the UE, the second multiflow aggregation instruction is used to instruct the multiflow aggregation gateway to establish a first multiflow aggregation channel between the UE and an evolved NodeB eNB in a 3GPP network, the first multiflow aggregation channel is used for transmitting a part of data in an uplink traffic flow of the UE or a part of data in a downlink traffic flow for the UE, where the part of data is offloaded to a non-3GPP network for transmission, other data in the uplink traffic flow or other data in the downlink traffic flow is offloaded to a 3GPP channel that is in the 3GPP network and that is between the UE and the eNB for transmission, the first multiflow aggregation channel includes a first subchannel between the UE and the multiflow aggregation gateway and a second subchannel between the multiflow aggregation gateway and the eNB, and the identifier of the UE is an identifier of the UE in the 3rd Generation Partnership Project 3GPP network; and returning, by the multiflow aggregation gateway, a first multiflow aggregation channel establishment response to the UE, to confirm that the first multiflow aggregation channel is successfully established.

With reference to the third aspect of the present invention, in a first possible implementation of the third aspect of the present invention, the first multiflow aggregation channel establishment request further includes a bearer identifier corresponding to the second subchannel, and before the returning, by the multiflow aggregation gateway, a first multiflow aggregation channel establishment response to the UE, the method further includes:

allocating, by the multiflow aggregation gateway according to the bearer identifier corresponding to the second subchannel, a tunnel to a bearer corresponding to the second subchannel;

sending, by the multiflow aggregation gateway, a third multiflow aggregation channel establishment request to the eNB, where the third multiflow aggregation channel establishment request includes the second multiflow aggregation instruction, the bearer identifier corresponding to the second subchannel, the identifier of the UE, and an endpoint identifier of the tunnel allocated to the bearer corresponding to the second subchannel; and receiving, by the multiflow aggregation gateway, a third multiflow aggregation channel establishment response returned by the eNB, to determine that the second subchannel is successfully established.

With reference to the third aspect of the present invention, in a second possible implementation of the third aspect of the present invention, the second subchannel is a device-level Internet Protocol IP channel or a preconfigured private IP channel.

With reference to any one of the third aspect of the present invention or the first and the second possible implementations of the third aspect of the present invention, in a third possible implementation of the third aspect of the present invention, the method further includes:

receiving, by the multiflow aggregation gateway, a second uplink data flow sent by the UE by using the first subchannel, and sending the second uplink data flow to the eNB by using the second subchannel, where the uplink traffic flow of the UE is split by the UE into the second uplink data flow and a first uplink data flow, and the first uplink data flow is sent to the eNB by using the 3GPP channel; or receiving, by the multiflow aggregation gateway, a second downlink data flow sent by the eNB by using the second subchannel, and sending the second downlink data flow to the UE by using the first subchannel, where the downlink traffic flow for the UE is split by the eNB into a first downlink data flow and the second downlink data flow, and the first downlink data flow is sent to the eNB by using the 3GPP channel.

With reference to the third possible implementation of the third aspect of the present invention, in a fourth possible implementation of the third aspect of the present invention, before the sending, by the multiflow aggregation gateway, the second uplink data flow to the eNB by using the second subchannel, the method further includes:

determining, by the multiflow aggregation gateway according to information included in the second uplink data flow, a bearer corresponding to the second uplink data flow, where the information included in the second uplink data flow is a bearer identifier corresponding to the uplink traffic flow, or the identifier of the UE and a bearer identifier corresponding to the uplink traffic flow, and the identifier of the UE is the identifier of the UE in the 3GPP network; and the sending the second uplink data flow to the eNB by using the second subchannel includes:

sending, by the multiflow aggregation gateway, the second uplink data flow to the eNB by using the bearer corresponding to the second uplink data flow.

With reference to the third possible implementation of the third aspect of the present invention, in a fifth possible implementation of the third aspect of the present invention, before the sending the second downlink data flow to the UE by using the first subchannel, the method further includes:

determining, by the multiflow aggregation gateway according to a bearer corresponding to the second downlink data flow passes, a bearer corresponding to the second downlink data flow, where the bearer corresponding to the second downlink data flow is the same as a bearer corresponding to the downlink traffic flow; and adding, by the multiflow aggregation gateway to the second downlink data flow, a bearer identifier corresponding to the second downlink data flow, where the second downlink data flow includes the bearer identifier corresponding to the second downlink data flow.

A fourth aspect of the present invention provides UE, including:

a receiving module, configured to receive a first multiflow aggregation instruction sent by an eNB in a 3GPP network, where the first multiflow aggregation instruction is used to instruct the UE to establish a first multiflow aggregation channel between the UE and the eNB via a non-3GPP network, the first multiflow aggregation channel is used for transmitting a part of data in an uplink traffic flow of the UE or a part of data in a downlink traffic flow for the UE, where the part of data is offloaded to the non-3GPP network for transmission, and other data in the uplink traffic flow or other data in the downlink traffic flow is offloaded to a 3GPP channel in the 3GPP network for transmission; and an establishment module, configured to establish the first multiflow aggregation channel.

With reference to the fourth aspect of the present invention, in a first possible implementation of the fourth aspect of the present invention, the UE further includes:

a splitting module, configured to split, by the UE, the uplink traffic flow of the UE into a first uplink data flow and a second uplink data flow; and a sending module, configured to: send the first uplink data flow to the eNB by using the 3GPP channel, and send the second uplink data flow to the eNB by using the first multiflow aggregation channel, so that the eNB aggregates the first uplink data flow with the second uplink data flow to form one traffic flow; where the receiving module is further configured to: receive a first downlink data flow sent by the eNB by using the 3GPP channel, and receive a second downlink data flow sent by the eNB by using the first multiflow aggregation channel; and the UE further includes an aggregation module, configured to aggregate the first downlink data flow with the second downlink data flow to form one traffic flow, where the downlink traffic flow for the UE is split by the eNB into the first downlink data flow and the second downlink data flow.

A fifth aspect of the present invention provides an eNB, including:

a sending module, configured to send a first multiflow aggregation instruction to UE, where the first multiflow aggregation instruction is used to instruct the UE to establish a first multiflow aggregation channel between the UE and the eNB via a non-3GPP network, the first multiflow aggregation channel is used for offloading a part of data in an uplink traffic flow of the UE or a part of data in a downlink traffic flow for the UE to the non-3GPP network for transmission, and other data in the uplink traffic flow or other data in the downlink traffic flow is offloaded to a 3GPP channel in a 3GPP network for transmission; and an establishment module, configured to establish the first multiflow aggregation channel.

With reference to the fifth aspect of the present invention, in a first possible implementation of the fifth aspect of the present invention, the eNB further includes:

a receiving module, configured to: receive a first uplink data flow sent by the UE by using the 3GPP channel, and receive a second uplink data flow sent by the UE by using the first multiflow aggregation channel; and an aggregation module, configured to: aggregate the first uplink data flow with the second uplink data flow to form one traffic flow, and send the traffic flow, where the uplink traffic flow of the UE is split by the UE into the first uplink data flow and the second uplink data flow; or the receiving module is further configured to receive a downlink traffic flow sent by a core network of the 3GPP network; and the eNB further includes a splitting module, configured to split the downlink traffic flow into a first downlink data flow and a second downlink data flow; and the sending module is further configured to: send the first downlink data flow to the UE by using the 3GPP channel, and send the second downlink data flow to the UE by using the first multiflow aggregation channel, so that the UE aggregates the first downlink data flow with the second downlink data flow to form one traffic flow.

A sixth aspect of the present invention provides a multiflow aggregation gateway, including:

a receiving module, configured to receive a first multiflow aggregation channel establishment request sent by UE, where the first multiflow aggregation channel establishment request includes a second multiflow aggregation instruction and an identifier of the UE, the second multiflow aggregation instruction is used to instruct the multiflow aggregation gateway to establish a first multiflow aggregation channel between the UE and an eNB in a 3GPP network, the first multiflow aggregation channel is used for transmitting a part of data in an uplink traffic flow of the UE or a part of data in a downlink traffic flow for the UE, where the part of data is offloaded to a non-3GPP network for transmission, other data in the uplink traffic flow or other data in the downlink traffic flow is offloaded to a 3GPP channel in the 3GPP network for transmission, the first multiflow aggregation channel includes a first subchannel between the UE and the multiflow aggregation gateway and a second subchannel between the multiflow aggregation gateway and the eNB, and the identifier of the UE is an identifier of the UE in the 3rd Generation Partnership Project 3GPP network; and a sending module, configured to return a first multiflow aggregation channel establishment response to the UE, to confirm that the first multiflow aggregation channel is successfully established.

A seventh aspect of the present invention provides UE, including: a processor, a memory, and a system bus, where the processor and the memory are connected and communicate with each other by using the system bus;

the memory is configured to store a computer-executable instruction; and the processor is configured to run the computer-executable instruction to perform the method according to any one of the first aspect of the present invention or the first to the tenth possible implementations of the first aspect of the present invention.

An eighth aspect of the present invention provides an eNB, including: a processor, a memory, and a system bus, where the processor and the memory are connected and communicate with each other by using the system bus;

the memory is configured to store a computer-executable instruction; and the processor is configured to run the computer-executable instruction to perform the method according to any one of the second aspect of the present invention or the first to the eighth possible implementations of the second aspect of the present invention.

A ninth aspect of the present invention provides a multiflow aggregation gateway, including: a processor, a memory, and a system bus, where the processor and the memory are connected and communicate with each other by using the system bus;

the memory is configured to store a computer-executable instruction; and the processor is configured to run the computer-executable instruction to perform the method according to any one of the third aspect of the present invention or the first to the fifth possible implementations of the third aspect of the present invention.

According to the traffic flow splitting method and apparatus provided in the embodiments of the present invention, in a process of accessing a 3GPP network by UE, an eNB sends a first multiflow aggregation instruction to the UE, to instruct the UE to establish a multiflow aggregation channel between the UE and the eNB via a non-3GPP network. The UE receives the first multiflow aggregation instruction, and establishes the first multiflow aggregation channel. The first multiflow aggregation channel is used for transmitting a part of data in an uplink traffic flow or a part of data in a downlink traffic flow for the UE, where the part of data is offloaded to the non-3GPP network for transmission, and other data in the uplink traffic flow or other data in the downlink traffic flow is offloaded to a 3GPP channel in the 3GPP network for transmission. In the method, transmission is simultaneously performed in the 3GPP network and the non-3GPP network, so that air-interface bandwidth is effectively increased.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

FIG. 1 is a schematic structural diagram of an LTE network;

FIG. 2 is a flowchart of a traffic flow splitting method according to Embodiment 1 of the present invention;

FIG. 5 is a flowchart of a traffic flow splitting method according to Embodiment 4 of the present invention;

FIG. 9 is a schematic structural diagram of a user plane protocol stack among UE, a multiflow aggregation gateway, and an eNB;

FIG. 11 is a schematic structural diagram of a control plane protocol stack among UE, a multiflow aggregation gateway, and an eNB;

DESCRIPTION OF EMBODIMENTS

Figure 3:
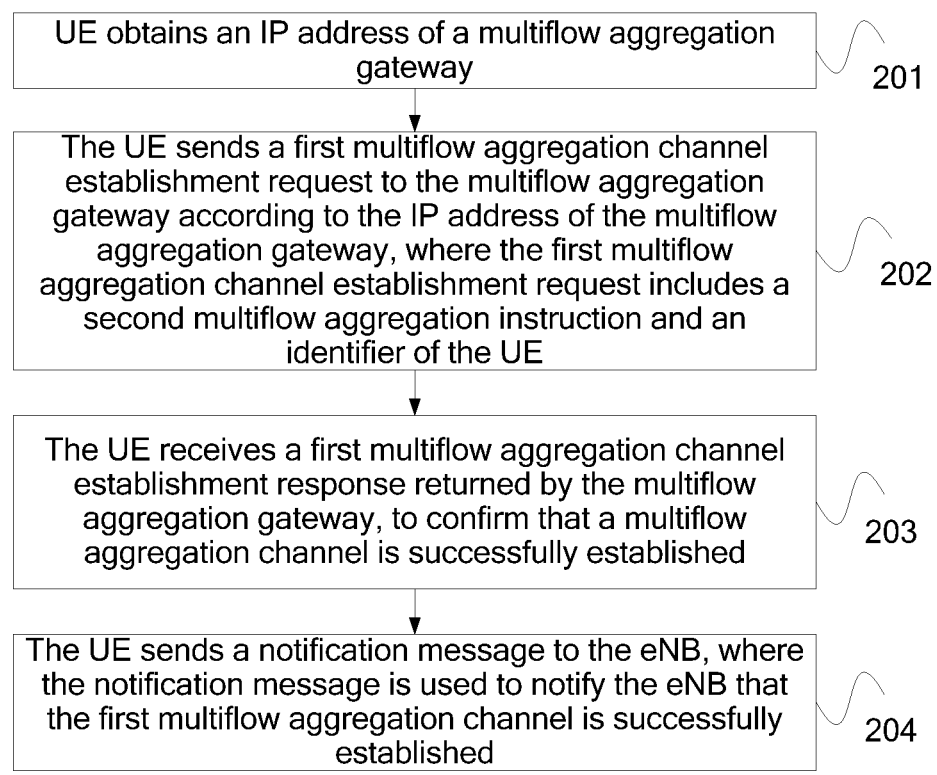
FIG. 3 is a flowchart of a method for establishing a first multiflow aggregation channel according to Embodiment 2 of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Methods in the embodiments of the present invention are applied to the following scenario: UE accesses a non-3GPP network from a 3GPP network on the basis of accessing the 3GPP network, that is, the UE accesses both the 3GPP network and the non-3GPP network. The 3GPP network includes an LTE network, a 2G network, a 3G network, and the like. The non-3GPP network includes a wireless local area network (WLAN for short), a Code Division Multiple Access (CDMA for short) network, a Worldwide Interoperability for Microwave Access (WiMAX for short) network, and the like. FIG. 1 is a schematic structural diagram of an LTE network. As shown in FIG. 1, the LTE network mainly includes an evolved universal terrestrial radio access network (E-UTRAN for short), a mobility management entity (MME for short), a home subscriber server (HSS for short), a serving gateway (S-GW for short), a packet data gateway (P-GW for short), a policy control rule making entity (PCRF for short), an IP service network of an operator, a serving GPRS support node (SGSN for short), and the like. The MME is responsible for non-access stratum (NAS for short) signaling and NAS signaling encryption between the MME and UE, allocates a temporary identity to the UE, selects network elements such as an S-GW and a P-GW of a core network, and provides functions such as roaming, tracking, and security. The MME is corresponding to a control plane part of an SGSN inside a Universal Mobile Telecommunications System (UMTS for short). The S-GW is a mobility anchor switched between local evolved NodeBs (eNB for short), and provides a function related to lawful interception. The P-GW is responsible for IP address allocation. The HSS is used to store subscription information of a user. The PCRF provides a policy and charging control rule.

Non-3GPP networks are further classified into a trusted non-3GPP network and an untrusted non-3GPP network. In an implementation, the trusted non-3GPP network accesses a 3GPP network by using an S2a interface between the 3GPP network and a P-GW, and the untrusted non-3GPP network accesses the 3GPP network by using an S2b interface between an evolved packet data gateway (evolved PDG ePDG for short) and the P-GW. The ePDN is responsible for forwarding or allocating a mobile IP address of UE, registering a local IP address of the UE, and binding the mobile IP address and the local IP address of the UE. When accessing is performed from the non-3GPP network, there is an important network element, that is, an authentication, authorization, and accounting (AAA for short) server that performs an authentication and authorization operation on the UE by interacting with an HSS, and registers, with the HSS, P-GW identification information used for each PDN connection established by the UE.

In another implementation, regardless of the trusted non-3GPP network and the untrusted non-3GPP network, the UE can establish a connection to the P-GW. In addition, when performing access by using the 3GPP network, the UE may also be bound to the P-GW by using the S2c interface.

In the prior art, the 3GPP standard protocol supports UE in simultaneous access to a 3GPP network and a non-3GPP network, that is, different data flows on a same PDN connection can be distributed in the 3GPP network and the non-3GPP network, so as to implement effective splitting and properly use network resources. However, in the prior art, data packets in a same traffic flow can be transmitted only in one access network, that is, a same traffic flow is transmitted in either the 3GPP network or the non-3GPP network. When the UE has only one traffic flow, bandwidth of the UE cannot be increased. In addition, when a traffic flow is switched between the two networks, multiple pieces of signaling are exchanged between the UE and a network side. Consequently, a traffic flow switching time is delayed.

To resolve the problem in the prior art, Embodiment 1 of the present invention provides a traffic flow splitting method.

FIG. 2 is a flowchart of the traffic flow splitting method according to Embodiment 1 of the present invention. As shown in FIG. 2, the method provided in this embodiment may include the following steps.

Step 101: UE receives a first multiflow aggregation instruction sent by an eNB in a 3GPP network, where the first multiflow aggregation instruction is used to instruct the UE to establish a first multiflow aggregation channel between the UE and the eNB via a non-3GPP network, the first multiflow aggregation channel is used for transmitting a part of data in an uplink traffic flow of the UE or a part of data in a downlink traffic flow for the UE, where the part of data is offloaded to the non-3GPP network for transmission, and other data in the uplink traffic flow or other data in the downlink traffic flow is offloaded to a 3GPP channel that is in the 3GPP network and that is between the UE and the eNB for transmission.

In an example for describing this embodiment, the 3GPP network is LTE network, and the non-3GPP network is a WLAN.

If both the UE and the eNB support a multiflow aggregation capability, the eNB may send the first multiflow aggregation instruction to the UE in a process of accessing the 3GPP network, to instruct the UE to establish the first multiflow aggregation channel. Optionally, before the eNB sends the multiflow aggregation instruction, the eNB needs to negotiate with the UE about a multiflow aggregation capability. The eNB sends the first multiflow aggregation instruction to the UE only when both the eNB and the UE support the multiflow aggregation capability. In specific negotiation, the UE may first send multiflow aggregation capability information of the UE to the eNB, so that the eNB determines, according to the multiflow aggregation capability information sent by the UE, whether to send the first multiflow aggregation instruction to the UE. The multiflow aggregation capability information sent by the UE is used to indicate whether the UE supports the multiflow aggregation capability. If the UE supports the multiflow aggregation capability, and the eNB also supports the multiflow aggregation capability, the eNB sends the first multiflow aggregation instruction to the UE. If the UE does not support the multiflow aggregation capability, the eNB does not send the first multiflow aggregation instruction to the UE. Specifically, the eNB may add the first multiflow aggregation instruction to a radio resource control connection configuration message that is in a PDN connection process, and send the first multiflow aggregation instruction to the UE.

Step 102: The UE establishes the first multiflow aggregation channel.

In the solution in this embodiment, a multiflow aggregation gateway is introduced. The multiflow aggregation gateway is configured to aggregate data in the non-3GPP network onto the eNB in the 3GPP network. When the multiflow aggregation gateway and the eNB are disposed independently, the first multiflow aggregation channel includes a first subchannel between the UE and the multiflow aggregation gateway and a second subchannel between the multiflow aggregation gateway and the eNB. When the multiflow aggregation gateway is integrated in the eNB, the first multiflow aggregation channel includes a third subchannel between the UE and the eNB. When the multiflow aggregation gateway is integrated with the eNB, the eNB can perceive successful establishment of the first multiflow aggregation channel. When the multiflow aggregation gateway and the eNB are disposed independently, the eNB cannot perceive whether the first multiflow aggregation channel is successfully established, and therefore, after successfully establishing the first multiflow aggregation channel, the UE further needs to notify the eNB that the first multiflow aggregation channel is successfully established.

In this embodiment, the first subchannel between the UE and the multiflow aggregation gateway is a channel of a UE granularity, a PDN connection granularity, or a bearer granularity. The second subchannel between the multiflow aggregation gateway and the eNB may be a channel of a UE granularity, a bearer granularity, a PDN connection granularity, or a device granularity. The 3GPP channel is a channel of a bearer granularity.

Step 103: The UE splits the uplink traffic flow of the UE into a first uplink data flow and a second uplink data flow, sends the first uplink data flow to the eNB by using the 3GPP channel, and sends the second uplink data flow to the eNB by using the first multiflow aggregation channel, so that the eNB aggregates the first uplink data flow with the second uplink data flow to form one traffic flow; or the UE receives a first downlink data flow sent by the eNB by using the 3GPP channel, receives a second downlink data flow sent by the eNB by using the first multiflow aggregation channel, and aggregates the first downlink data flow with the second downlink data flow to form one traffic flow, where the downlink traffic flow for the UE is split by the eNB into the first downlink data flow and the second downlink data flow.

After the first multiflow aggregation channel is established, if the UE needs to transmit uplink data, the UE splits an uplink traffic flow into a first uplink data flow and a second uplink data flow. Then, the UE sends the first uplink data flow to the eNB by using the 3GPP channel, and sends the second uplink data flow to the eNB by using the first multiflow aggregation channel, so that a same traffic flow can be simultaneously transmitted in the 3GPP network and the non-3GPP network. On an eNB side, the eNB aggregates the first uplink data flow with the second uplink data flow to form one traffic flow, and then sends the aggregated traffic flow to a core network of the 3GPP network by using a corresponding bearer. That is, the eNB sends the aggregated traffic flow to an S-GW, the S-GW then sends the aggregated traffic flow to a P-GW, and the P-GW sends the aggregated traffic flow to the network.

In this embodiment, the UE needs to aggregate or split data packets on a same bearer. If an MME does not send, to the eNB, a traffic flow template (TFT for short) corresponding to the bearer, the UE needs to add some information to the second uplink data flow. The added information may be a bearer identifier corresponding to the uplink traffic flow, or an identifier of the UE and a bearer identifier corresponding to the uplink traffic flow, or a first Media Access Control MAC address, or a second MAC address and a bearer identifier corresponding to the uplink traffic flow, so that the eNB determines, according to the information carried in the second uplink data flow, a bearer corresponding to the second uplink data flow. The identifier of the UE is an identifier of the UE in the 3GPP network, the first MAC address is a MAC address corresponding to a bearer corresponding to the uplink traffic flow, and the second MAC address is a MAC address corresponding to a packet data network PDN connection corresponding to the uplink traffic flow.

In specific sending, if the second subchannel is a channel of a PDN connection granularity, a UE granularity, or a bearer granularity, the UE adds, to the second uplink data flow, the bearer identifier of the bearer corresponding to the uplink traffic flow, and sends the second uplink data flow to the eNB by using the first multiflow aggregation channel.

The second uplink data flow includes the bearer identifier corresponding to the uplink traffic flow.

If the second subchannel is a channel of a device granularity, the eNB cannot determine, according to the second subchannel, specific UE that sends the second uplink data flow. Therefore, the UE needs to add, to the second uplink data flow, the identifier of the UE and the bearer identifier of the bearer corresponding to the uplink traffic flow, and send the second uplink data flow to the eNB by using the first multiflow aggregation channel. The second uplink data flow includes the identifier of the UE and the bearer identifier corresponding to the uplink traffic flow. Herein, the identifier of the UE is the identifier of the UE in the 3GPP network, and may be specifically a radio network temporary identifier (RNTI for short), a globally unique temporary UE identity (GUTI for short), or an S-temporary mobile subscriber identity (S-TMSI for short).

When the multiflow aggregation gateway is integrated in the eNB, the first multiflow aggregation channel between the UE and the eNB is a point-to-point (P2P for short) channel of a bearer granularity or a PDN connection granularity. The multiflow aggregation gateway allocates a MAC address to each bearer, or allocates a MAC address to each PDN connection. In the following, a MAC address allocated to a bearer by the multiflow aggregation gateway is referred to as the first MAC address, and a MAC address allocated to a PDN connection by the multiflow aggregation gateway is referred to as the second MAC address. The multiflow aggregation gateway sends the second MAC address to the UE in a PDN connection establishment process, and sends the first MAC address to the UE in a dedicated-bearer establishment process.

If the first multiflow aggregation channel is a channel of a PDN connection granularity, in specific sending, the UE encapsulates a data packet in the second uplink data flow by using the second MAC address, adds, to the second uplink data flow, the bearer identifier corresponding to the uplink traffic flow, and sends the second uplink data flow to the eNB by using the first multiflow aggregation channel. The second uplink data flow includes the second MAC address and the bearer identifier corresponding to the uplink traffic flow.

If the first multiflow aggregation channel is a channel of a bearer granularity, in specific sending, the UE encapsulates a data packet in the second uplink data flow by using the first MAC address, and sends the encapsulated second uplink data flow to the eNB by using the first multiflow aggregation channel. The second uplink data flow includes the first MAC address.

The second downlink data flow that is sent by the eNB by using the first multiflow aggregation channel and is received by the UE includes a bearer identifier corresponding to the downlink traffic flow, or an identifier of the UE and a bearer identifier corresponding to the downlink traffic flow, or a first MAC address, or a second MAC address and a bearer identifier corresponding to the downlink traffic flow. Before the UE aggregates the first downlink data flow with the second downlink data flow to form one traffic flow, the UE determines, according to information included in the second downlink data flow, a bearer corresponding to the second downlink data flow. The UE determines that a bearer corresponding to the first downlink data flow and the bearer corresponding to the second downlink data flow are a same bearer. The eNB sends first downlink data flow to the UE by using the 3GPP channel, and the 3GPP channel is a channel of a bearer granularity. Therefore, the UE can determine, according to the 3GPP channel, a bearer corresponding to the first downlink data flow passes.

In addition to determining, according to the information included in the second downlink data flow, the bearer corresponding to the second downlink data flow, the UE may determine, according to a traffic flow template, the bearer corresponding to the second downlink data flow. Correspondingly, the UE further needs to receive a traffic flow template sent by the MME. The traffic flow template is corresponding to a bearer corresponding to the downlink traffic flow, each bearer is corresponding to one traffic flow template, and the traffic flow template includes matching information of the bearer corresponding to the downlink traffic flow. The matching information is, for example, 5-tuple information of a traffic flow that can be transmitted on the bearer corresponding to the traffic flow template.

Before the UE aggregates the first downlink data flow with the second downlink data flow to form one traffic flow, the UE matches the second downlink data flow and the traffic flow template, to determine the bearer corresponding to the second downlink data flow. Specifically, the UE matches the second downlink data flow and matching information of a traffic flow transmitted on the bearer corresponding to the traffic flow template, to determine whether the second downlink data flow is transmitted on the bearer corresponding to the traffic flow template. If the second downlink data flow is transmitted on the bearer corresponding to the traffic flow template, the UE determines the bearer corresponding to the traffic flow template as the bearer corresponding to the second downlink data flow.

It should be noted that in this embodiment, when splitting a traffic flow, the UE and the eNB may split the traffic flow at any layer in a protocol, for example, split the traffic flow at a Packet Data Convergence Protocol (PDCP for short) layer, at a MAC layer, or at an IP layer.

In addition, how the UE and the eNB specifically split a traffic flow is not limited in this embodiment.

In the method in this embodiment, in a process of accessing a 3GPP network, UE receives a first multiflow aggregation instruction sent by an eNB in the 3GPP network. The first multiflow aggregation instruction is used to instruct the UE to establish a first multiflow aggregation channel between the UE and the eNB via a non-3GPP network. The first multiflow aggregation channel is used for transmitting a part of data in an uplink traffic flow of the UE or a part of data in a downlink traffic flow for the UE, where the part of data is offloaded to the non-3GPP network for transmission, and other data in the uplink traffic flow or other data in the downlink traffic flow is offloaded to a 3GPP channel in the 3GPP network for transmission. The UE establishes the first multiflow aggregation channel according to the first multiflow aggregation instruction. After establishing the first multiflow aggregation channel, the UE may split a traffic flow into two data flows. A part of data is transmitted by using the 3GPP channel, and other data is transmitted by using the first multiflow aggregation channel. Therefore, a same traffic flow can be simultaneously transmitted in the 3GPP network and the non-3GPP network, so that air-interface bandwidth is effectively increased. In addition, when the UE moves between the 3GPP network and the non-3GPP network, signaling exchange is reduced, and a switching delay is shortened.

Bearers established by the UE are classified into a default bearer and a dedicated bearer. The default bearer is a user bearer that is of data and signaling and that meets default QoS, is established after establishment of a PDN connection, is destructed after removal of the PDN connection, and provides a permanent online IP transmission service for a user. The dedicated bearer is established on the basis of establishment of a PDN connection, and is established to provide a particular QoS transmission requirement (which cannot be met by the default bearer). A QoS requirement of the dedicated bearer is usually higher than a QoS requirement of the default bearer.

Optionally, if the UE subsequently establishes a dedicated bearer, the UE further needs to establish a second multiflow aggregation channel for the dedicated bearer. Specifically, the UE receives a fourth multiflow aggregation instruction sent by the eNB. The fourth multiflow aggregation instruction is used to instruct the UE to establish, for the dedicated bearer, the second multiflow aggregation channel between the UE and the eNB via the non-3GPP network. The second multiflow aggregation channel is used for transmitting a part of data in an uplink traffic flow transmitted on the dedicated bearer or a part of data in a downlink traffic flow transmitted on the dedicated bearer. The part of data is offloaded to the non-3GPP network for transmission, and other data in the uplink traffic flow transmitted on the dedicated bearer or other data in the downlink traffic flow transmitted on the dedicated bearer is offloaded to the 3GPP channel for transmission. The UE establishes the second multiflow aggregation channel according to the fourth multiflow aggregation instruction.

On the basis of Embodiment 1, Embodiment 2 of the present invention provides a method for establishing a first multiflow aggregation channel. In this embodiment, the first multiflow aggregation channel includes a first subchannel and a second subchannel. FIG. 3 is a flowchart of the method for establishing a first multiflow aggregation channel according to Embodiment 2 of the present invention. As shown in FIG. 3, the method in this embodiment may include the following steps.

Step 201: UE obtains an IP address of a multiflow aggregation gateway.

The UE may obtain the IP address of the multiflow aggregation gateway in the following three manners.

(1) In an RRC connection establishment process, the UE receives an RRC message sent by an eNB. The RRC message includes the IP address of the multiflow aggregation gateway or an identifier of the multiflow aggregation gateway. If the RRC message includes the identifier of the multiflow aggregation gateway, the UE further needs to obtain the IP address of the multiflow aggregation gateway according to the identifier of the multiflow aggregation gateway.

Herein, the RRC message is a general name of all messages between the UE and the eNB in the RRC connection establishment process. The eNB may add the identifier of the multiflow aggregation gateway or the IP address of the multiflow aggregation gateway to any message in the RRC connection establishment process, and send the message to the UE.

(2) In an authentication and authorization of accessing a non-3GPP network, the UE receives an authentication message sent by the non-3GPP network. The authentication message includes the IP address of the multiflow aggregation gateway or an identifier of the multiflow aggregation gateway. If the authentication message includes the identifier of the multiflow aggregation gateway, the UE obtains the IP address of the multiflow aggregation gateway according to the identifier of the multiflow aggregation gateway.

Herein, the authentication message is a general name of all messages between the UE and the non-3GPP network in the authentication and authorization. The non-3GPP network may add the IP address of the multiflow aggregation gateway or the identifier of the multiflow aggregation gateway to any message in the authentication and authorization, and send the message to the UE.

(3) The UE sends a fully-qualified domain name (FQDN for short) request to a domain name server (DNS for short). The FQDN request is used for obtaining the IP address of the multiflow aggregation gateway. The UE receives an FQDN response returned by the DNS. The FQDN response includes the IP address of the multiflow aggregation gateway.

Step 202: The UE sends a first multiflow aggregation channel establishment request to the multiflow aggregation gateway according to the IP address of the multiflow aggregation gateway, where the first multiflow aggregation channel establishment request includes a second multiflow aggregation instruction and an identifier of the UE.

After obtaining the IP address of the multiflow aggregation gateway, the UE sends the first multiflow aggregation channel establishment request to the multiflow aggregation gateway according to the IP address of the multiflow aggregation gateway, to request to establish a first multiflow aggregation channel. The first multiflow aggregation channel establishment request includes the second multiflow aggregation instruction and the identifier of the UE. The second multiflow aggregation instruction is used to instruct the multiflow aggregation gateway to establish the first multiflow aggregation channel. In a specific implementation, optionally, the first multiflow aggregation channel establishment request may be an authentication message. That is, in an authentication and authorization process, the UE adds the second multiflow aggregation instruction and the identifier of the UE to the authentication message, and sends the authentication message to the multiflow aggregation gateway. Optionally, the first multiflow aggregation channel establishment request may be a key exchange version 2 (IKEv2 for short) message or wireless local area network control protocol (WLCP for short) signaling.

In this embodiment, an interface between the multiflow aggregation gateway and the eNB needs to be newly added. It is assumed that the newly added interface is an S20 interface. The multiflow aggregation gateway communicates with the eNB by using the S20 interface. If there is no control plane protocol stack but only a user plane protocol stack on the S20 interface, the multiflow aggregation gateway does not need to establish a second subchannel between the multiflow aggregation gateway and the eNB by using control plane signaling. The second subchannel is a device-level IP tunnel or a preconfigured private IP channel. In this case, the second subchannel is not a channel of a bearer granularity. After receiving the first multiflow aggregation channel establishment request, the multiflow aggregation gateway returns a first multiflow aggregation channel establishment response to the UE, to determine that the first multiflow aggregation channel is successively established.

If there are both a control plane protocol stack and a user plane protocol stack on the S20 interface, and a second subchannel of a bearer granularity or a PDN connection granularity is established to the eNB by using the control plane protocol stack and the S20 interface, after receiving the first multiflow aggregation channel establishment request, the multiflow aggregation gateway further sends a third multiflow aggregation channel establishment request to the eNB. The third multiflow aggregation channel establishment request includes the second multiflow aggregation instruction, a bearer identifier corresponding to the second subchannel, an identifier of the UE, and an endpoint identifier of a tunnel allocated to a bearer corresponding to the second subchannel. The tunnel allocated to the bearer corresponding to the second subchannel includes an uplink tunnel and a downlink tunnel. The tunnel may be specifically a general packet radio service tunneling protocol-user plane (GTP-U for short) tunnel. The eNB returns a second multiflow aggregation channel establishment response to the multiflow aggregation gateway, to determine that the second subchannel is successfully established. The multiflow aggregation gateway returns a first multiflow aggregation channel establishment response to the UE after receiving the second multiflow aggregation channel establishment response, to determine that the first multiflow aggregation channel is successfully established.

Step 203: The UE receives a first multiflow aggregation channel establishment response returned by the multiflow aggregation gateway, to confirm that the multiflow aggregation channel is successfully established.

Step 204: The UE sends a notification message to an eNB, where the notification message is used to notify the eNB that the first multiflow aggregation channel is successfully established.

In the method provided in this embodiment, UE obtains an IP address of a multiflow aggregation gateway, and sends a first multiflow aggregation channel establishment request to the multiflow aggregation gateway according to the IP address of the multiflow aggregation gateway, to establish a first multiflow aggregation channel. The first multiflow aggregation channel establishment request includes a second multiflow aggregation instruction and an identifier of the UE. Then, the UE receives a first multiflow aggregation channel establishment response returned by the multiflow aggregation gateway, to confirm that the first multiflow aggregation channel is successfully established.

When a multiflow aggregation gateway is integrated with an eNB, UE establishes a first multiflow aggregation channel. Specifically, the UE obtains an IP address of the eNB, and the UE sends a second multiflow aggregation channel establishment request to the eNB according to the IP address of the eNB. The second multiflow aggregation channel establishment request includes a third multiflow aggregation instruction and an identifier of the UE, and the third multiflow aggregation instruction is used to instruct the eNB to establish a first multiflow aggregation channel. The eNB returns a second multiflow aggregation channel establishment response to the UE according to the second multiflow aggregation channel establishment request, to confirm that the first multiflow aggregation channel is successfully established.

Figure 4:
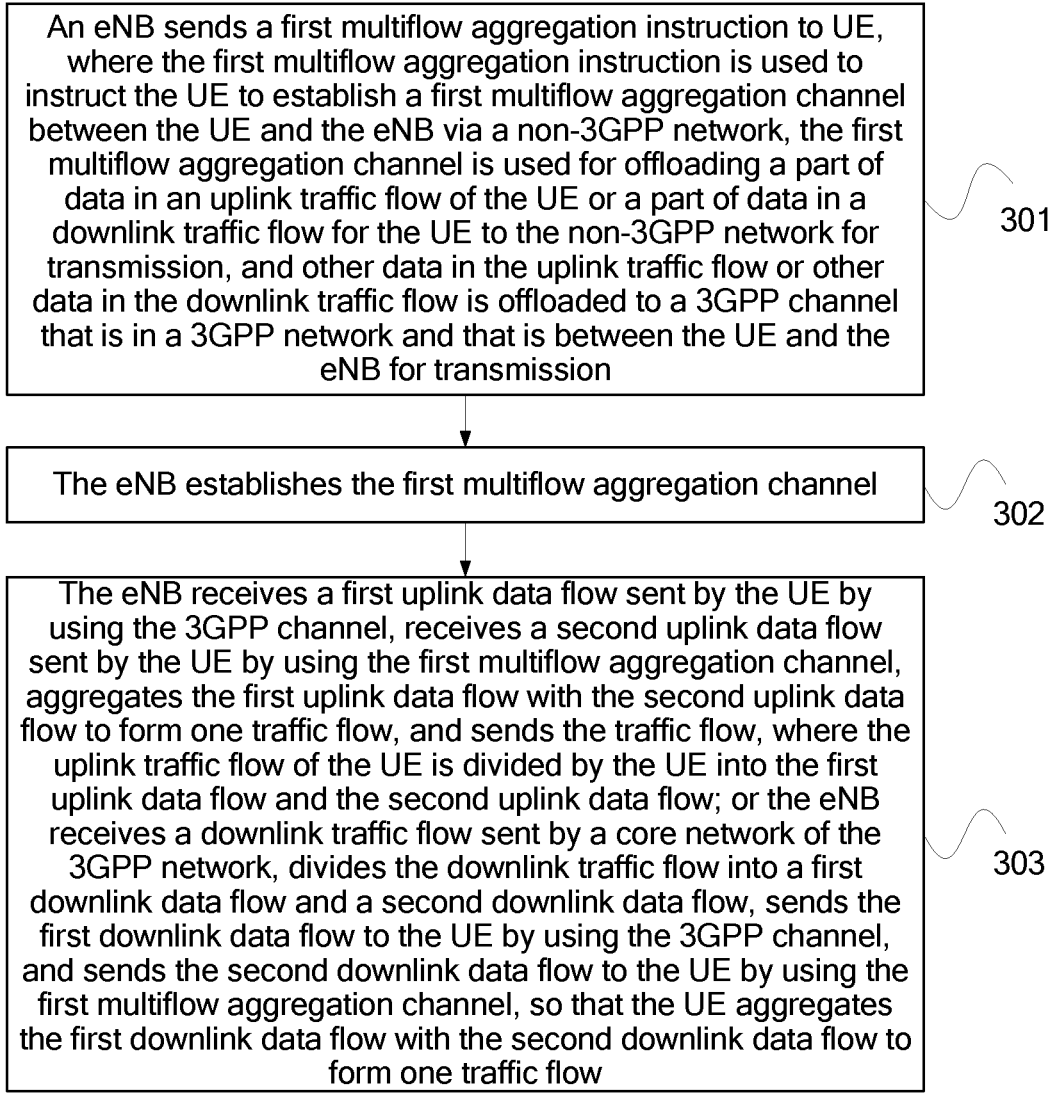
FIG. 4 is a flowchart of a traffic flow splitting method according to Embodiment 3 of the present invention.

FIG. 4 is a flowchart of a traffic flow splitting method according to Embodiment 3 of the present invention. The traffic flow splitting method is described from an eNB side in this embodiment. As shown in FIG. 4, the method provided in this embodiment may include the following steps.

Step 301: An eNB sends a first multiflow aggregation instruction to UE, where the first multiflow aggregation instruction is used to instruct the UE to establish a first multiflow aggregation channel between the UE and the eNB via a non-3GPP network, the first multiflow aggregation channel is used for offloading a part of data in an uplink traffic flow of the UE or a part of data in a downlink traffic flow for the UE to the non-3GPP network for transmission, and other data in the uplink traffic flow or other data in the downlink traffic flow is offloaded to a 3GPP channel that is in a 3GPP network and that is between the UE and the eNB for transmission.

Step 302: The eNB establishes the first multiflow aggregation channel.

For a method for establishing the first multiflow aggregation channel, refer to related descriptions in Embodiment 1 and Embodiment 2. Details are not described herein again.

Step 303: The eNB receives a first uplink data flow sent by the UE by using the 3GPP channel, receives a second uplink data flow sent by the UE by using the first multiflow aggregation channel, aggregates the first uplink data flow with the second uplink data flow to form one traffic flow, and sends the traffic flow, where the uplink traffic flow of the UE is split by the UE into the first uplink data flow and the second uplink data flow; or the eNB receives a downlink traffic flow sent by a core network of the 3GPP network, splits the downlink traffic flow into a first downlink data flow and a second downlink data flow, sends the first downlink data flow to the UE by using the 3GPP channel, and sends the second downlink data flow to the UE by using the first multiflow aggregation channel, so that the UE aggregates the first downlink data flow with the second downlink data flow to form one traffic flow.

For the uplink traffic flow, the second uplink data flow that is sent by the UE by using the first multiflow aggregation channel and is received by the eNB includes a bearer identifier corresponding to the uplink traffic flow, or an identifier of the UE and a bearer identifier corresponding to the uplink traffic flow, or a first MAC address, or a second MAC address and a bearer identifier corresponding to the uplink traffic flow. Before the eNB aggregates the first uplink data flow with the second uplink data flow to form one traffic flow, and sends the traffic flow, the eNB determines, according to information included in the second uplink data flow, a bearer corresponding to the second uplink data flow. When a second subchannel is not a channel of a bearer granularity, the eNB determines, according to the information included in the second uplink data flow, the bearer corresponding to the second uplink data flow. When the second subchannel is a channel of a bearer granularity, a multiflow aggregation gateway determines, according to the information included in the second uplink data flow, the bearer corresponding to the second uplink data flow, and sends the second uplink data flow to the eNB according to the bearer corresponding to the second uplink data flow, and the eNB determines, according to a second uplink data flow receiving channel, the bearer corresponding to the second uplink data flow.

Because the 3GPP channel is a channel of a bearer granularity, the eNB may determine, according to a bearer corresponding to the first uplink data flow passes, a bearer corresponding to the first uplink data flow. After determining the bearer corresponding to the first uplink data flow and the bearer corresponding to the second uplink data flow, the eNB compares the bearer corresponding to the first uplink data flow with the bearer corresponding to the second uplink data flow. If the bearer corresponding to the first uplink data flow is the same as the bearer corresponding to the second uplink data flow, the eNB aggregates the first uplink data flow with the second uplink data flow to form one traffic flow, and sends the aggregated traffic flow to the core network by using the same bearer.

If an MME sends a traffic flow template to the eNB, the eNB may determine, according to the traffic flow template, the bearer corresponding to the second uplink data flow. Correspondingly, the eNB receives the traffic flow template sent by the MME. The traffic flow template is corresponding to a bearer corresponding to the uplink traffic flow, each bearer is corresponding to one traffic flow template, and the traffic flow template includes matching information of the bearer corresponding to the uplink traffic flow. Before the eNB aggregates the first uplink data flow with the second uplink data flow to form one traffic flow, and sends the traffic flow, the eNB matches the second uplink data flow and the traffic flow template, to determine the bearer corresponding to the second uplink data flow, and determines whether the bearer corresponding to the second uplink data flow and the bearer corresponding to the first uplink data flow are a same bearer. If the eNB determines that the bearer corresponding to the second uplink data flow and the bearer corresponding to the first uplink data flow are a same bearer, the eNB aggregates the first uplink data flow with the second uplink data flow to form one traffic flow.

For the downlink traffic flow, if a second subchannel is not a channel of a bearer granularity, that the eNB sends the second downlink data flow to the UE by using the first multiflow aggregation channel is specifically as follows:

If the second subchannel is a channel of a UE granularity or a PDN connection granularity, the eNB adds, to the second downlink data flow, a bearer identifier corresponding to the downlink traffic flow, and sends the second downlink data flow to the UE by using the first multiflow aggregation channel. The second downlink data flow includes the bearer identifier corresponding to the downlink traffic flow.

If the second subchannel is a channel of a device granularity, the eNB adds, to the second downlink data flow, an identifier of the UE and a bearer identifier corresponding to the downlink traffic flow, and sends the second downlink data flow to the UE by using the first multiflow aggregation channel. The second downlink data flow includes the identifier of the UE and the bearer identifier corresponding to the downlink traffic flow.

If a third subchannel is a P2P channel of a bearer granularity, the eNB encapsulates a data packet in the second downlink data flow by using a first Media Access Control MAC address, and sends the encapsulated second downlink data flow to the UE by using the first multiflow aggregation channel.

If a third subchannel is a P2P channel of a PDN connection granularity, the eNB encapsulates a data packet in the second downlink data flow by using a second MAC address, adds, to the encapsulated second downlink data flow, a bearer identifier corresponding to the downlink traffic flow, and sends the second downlink data flow to the UE by using the first multiflow aggregation channel.

If the second subchannel is a channel of a bearer granularity, the eNB may send the second downlink data flow to the multiflow aggregation gateway. The multiflow aggregation gateway determines, according to a bearer corresponding to the second downlink data flow passes, a bearer corresponding to the second downlink data flow. The bearer corresponding to the second downlink data flow is the same as a bearer corresponding to the downlink traffic flow. The multiflow aggregation gateway adds, to the second downlink data flow, a bearer identifier corresponding to the second downlink data.

In this embodiment, if the eNB subsequently establishes a dedicated bearer for the UE, the eNB sends a third multiflow aggregation instruction to the UE. The third multiflow aggregation instruction is used to instruct the UE to establish, for the dedicated bearer, a second multiflow aggregation channel between the UE and the eNB via the non-3GPP network. After receiving the multiflow aggregation instruction, the UE initiates establishment of the second multiflow aggregation channel.

In the method in this embodiment, an eNB sends a first multiflow aggregation instruction to UE, to instruct the UE to establish a first multiflow aggregation channel between the UE and the eNB via a non-3GPP network. After the first multiflow aggregation channel is successfully established, the eNB and the UE may split a same traffic flow to a 3GPP channel and the first multiflow aggregation channel for simultaneous transmission. Therefore, a same traffic flow can be simultaneously transmitted in a 3GPP network and the non-3GPP network, air-interface bandwidth is effectively increased, and resource utilization is improved.

FIG. 5 is a flowchart of a traffic flow splitting method according to Embodiment 4 of the present invention. This embodiment is described from a multiflow aggregation gateway side. As shown in FIG. 5, the method provided in this embodiment may include the following steps.

Step 401: A multiflow aggregation gateway receives a first multiflow aggregation channel establishment request sent by UE, where the first multiflow aggregation channel establishment request includes a second multiflow aggregation instruction and an identifier of the UE, the second multiflow aggregation instruction is used to instruct the multiflow aggregation gateway to establish a first multiflow aggregation channel between the UE and an eNB in a 3GPP network, and the first multiflow aggregation channel is used for transmitting a part of data in an uplink traffic flow of the UE or a part of data in a downlink traffic flow for the UE, where the part of data is offloaded to a non-3GPP network for transmission, and other data in the uplink traffic flow or other data in the downlink traffic flow is offloaded to a 3GPP channel that is in the 3GPP network and that is between the UE and the eNB for transmission.

In this embodiment, the first multiflow aggregation channel includes a first subchannel between the UE and the multiflow aggregation gateway and a second subchannel between the multiflow aggregation gateway and the eNB. For a specific method for establishing the second subchannel, refer to related descriptions in Embodiment 1. Details are not described herein again.

Step 402: The multiflow aggregation gateway returns a first multiflow aggregation channel establishment response to the UE, to confirm that the first multiflow aggregation channel is successfully established.

Step 403: The multiflow aggregation gateway receives a second uplink data flow sent by the UE by using a first subchannel, and sends the second uplink data flow to the eNB by using a second subchannel, where the uplink traffic flow of the UE is split by the UE into the second uplink data flow and a first uplink data flow, and the first uplink data flow is sent to the eNB by using the 3GPP channel; or the multiflow aggregation gateway receives a second downlink data flow sent by the eNB by using a second subchannel, and sends the second downlink data flow to the UE by using a first subchannel, where the downlink traffic flow for the UE is split by the eNB into a first downlink data flow and the second downlink data flow, and the first downlink data flow is sent to the eNB by using the 3GPP channel.

When the second subchannel is a channel of a bearer granularity, before the multiflow aggregation gateway sends the second uplink data flow to the eNB by using the second subchannel, the multiflow aggregation gateway determines, according to information included in the second uplink data flow, a bearer corresponding to the second uplink data flow. The information included in the second uplink data flow is a bearer identifier corresponding to the uplink traffic flow. That the multiflow aggregation gateway sends the second uplink data flow to the eNB by using the second subchannel is specifically: sending, by the multiflow aggregation gateway, the second uplink data flow to the eNB by using the bearer corresponding to the second uplink data flow. When the second subchannel is not a channel of a bearer granularity, when receiving the second uplink data flow sent by the UE, the multiflow aggregation gateway sends the second uplink data flow to the eNB directly by using the second subchannel, and the eNB determines, according to information included in the second uplink data flow, a bearer corresponding to the second uplink data flow.

When the second subchannel is a channel of a bearer granularity, after splitting the downlink traffic flow into the first downlink data flow and the second downlink data flow, the eNB sends the second downlink data flow to the multiflow aggregation gateway by using a bearer corresponding to the downlink traffic flow. Before the multiflow aggregation gateway sends the second downlink data flow to the UE by using the first subchannel, the multiflow aggregation gateway determines, according to a second downlink data flow receiving channel, a bearer corresponding to second downlink data flow. The bearer corresponding to the second downlink data flow is the same as the bearer corresponding to the downlink traffic flow. The multiflow aggregation gateway adds, to the second downlink data flow, a bearer identifier corresponding to the second downlink data flow. When the second subchannel is a channel of a device granularity, the eNB adds, to the second downlink data flow, the identifier of the UE and a bearer identifier corresponding to the downlink traffic flow. After receiving the second downlink data flow, the multiflow aggregation gateway sends the second downlink data flow to the UE according to the identifier of the UE included in the second downlink data flow. When the second subchannel is a channel of a UE granularity or a PDN connection granularity, the eNB adds, to the second downlink data flow, a bearer identifier corresponding to the downlink traffic flow. After receiving the second downlink data flow, the multiflow aggregation gateway determines, according to the second subchannel, specific UE to which the second downlink data flow is sent.

In the method in this embodiment, UE sends a first multiflow aggregation channel establishment request to a multiflow aggregation gateway. The first multiflow aggregation channel establishment request includes a second multiflow aggregation instruction and an identifier of the UE. The second multiflow aggregation instruction is used to instruct the multiflow aggregation gateway to establish a first multiflow aggregation channel between the UE and an eNB. After the first multiflow aggregation channel is established, the UE may simultaneously transmit a traffic flow on a 3GPP channel and the first multiflow aggregation channel, so that air-interface bandwidth is effectively increased, and resource utilization is improved.

In the following, establishment of a first multiflow aggregation channel and a second multiflow aggregation channel is described in detail by using several specific embodiments. In an example for describing the following embodiments, a 3GPP network is an LTE network, a non-3GPP network is a WLAN, and splitting is performed based on PDCP.

Figure 6:
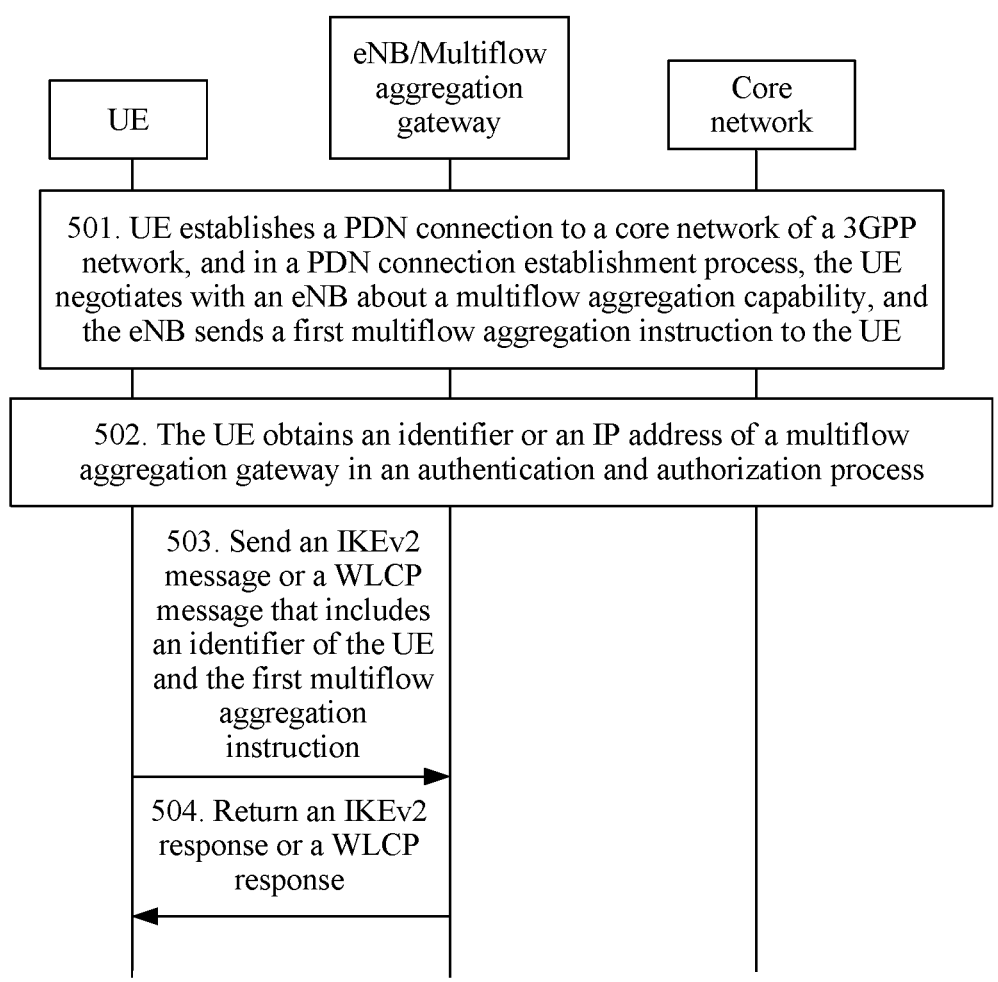
FIG. 6 is a signaling flowchart of establishing a first multiflow aggregation channel according to Embodiment 5 of the present invention.

FIG. 6 is a signaling flowchart of establishing a first multiflow aggregation channel according to Embodiment 5 of the present invention. In this embodiment, a multiflow aggregation gateway is integrated in an eNB, and UE interacts with the multiflow aggregation gateway by using an IKEv2 message or a WLCP message. As shown in FIG. 6, a method provided in this embodiment may include the following steps.

Step 501: UE establishes a PDN connection to a core network of a 3GPP network, and in a PDN connection establishment process, the UE negotiates with an eNB about a multiflow aggregation capability, and the eNB sends a first multiflow aggregation instruction to the UE.

The eNB may send the first multiflow aggregation instruction to the UE by adding the first multiflow aggregation instruction to an RRC connection reconfiguration message that is in a default-bearer establishment process. Optionally, in the PDN connection establishment process, an MME sends, to the UE, a traffic flow template corresponding to a default bearer. Optionally, the MME further sends, to the eNB, the traffic flow template corresponding to the default bearer.

In this step, the UE exchanges signaling with the eNB multiple times in the PDN connection establishment process. Multiflow aggregation capability information of the UE and the first multiflow aggregation instruction may be carried in any message.

Step 502: The UE obtains an identifier or an IP address of a multiflow aggregation gateway in an authentication and authorization process.

In this embodiment, the multiflow aggregation gateway is integrated in the eNB. The identifier of the multiflow aggregation gateway is an identifier of the eNB, and the IP address of the multiflow aggregation gateway is an IP address of the eNB. Optionally, the UE may obtain the identifier or the IP address of the eNB in the PDN connection establishment process. That is, in step 501, the eNB sends the identifier or the IP address of the eNB to the UE.

Multiple pieces of signaling are exchanged in the authentication and authorization process. The authorization and authentication process is the prior art, and is therefore not specifically described in this embodiment. The identifier or the IP address of the eNB may be carried in any signaling in the authorization and authentication process.

Step 503: The UE sends an IKEv2 message or a WLCP message to the multiflow aggregation gateway according to the obtained identifier or IP address of the multiflow aggregation gateway, where the IKEv2 message or the WLCP message includes an identifier of the UE and the first multiflow aggregation instruction.

Optionally, the UE may send the identifier of the UE and the first multiflow aggregation instruction to the eNB in step 502. In this embodiment, the IKEv2 message is specifically IKEv2 signaling, and the IKEv2 signaling is used for establishing an IPSec tunnel. The WLCP message is specifically a WLCP PDN connectivity request.

Step 504: The multiflow aggregation gateway returns an IKEv2 response or a WLCP response to the UE, to determine that a first multiflow aggregation channel is successfully established.

The WLCP response is specifically a WLCP PDN connectivity response.

Figure 7:
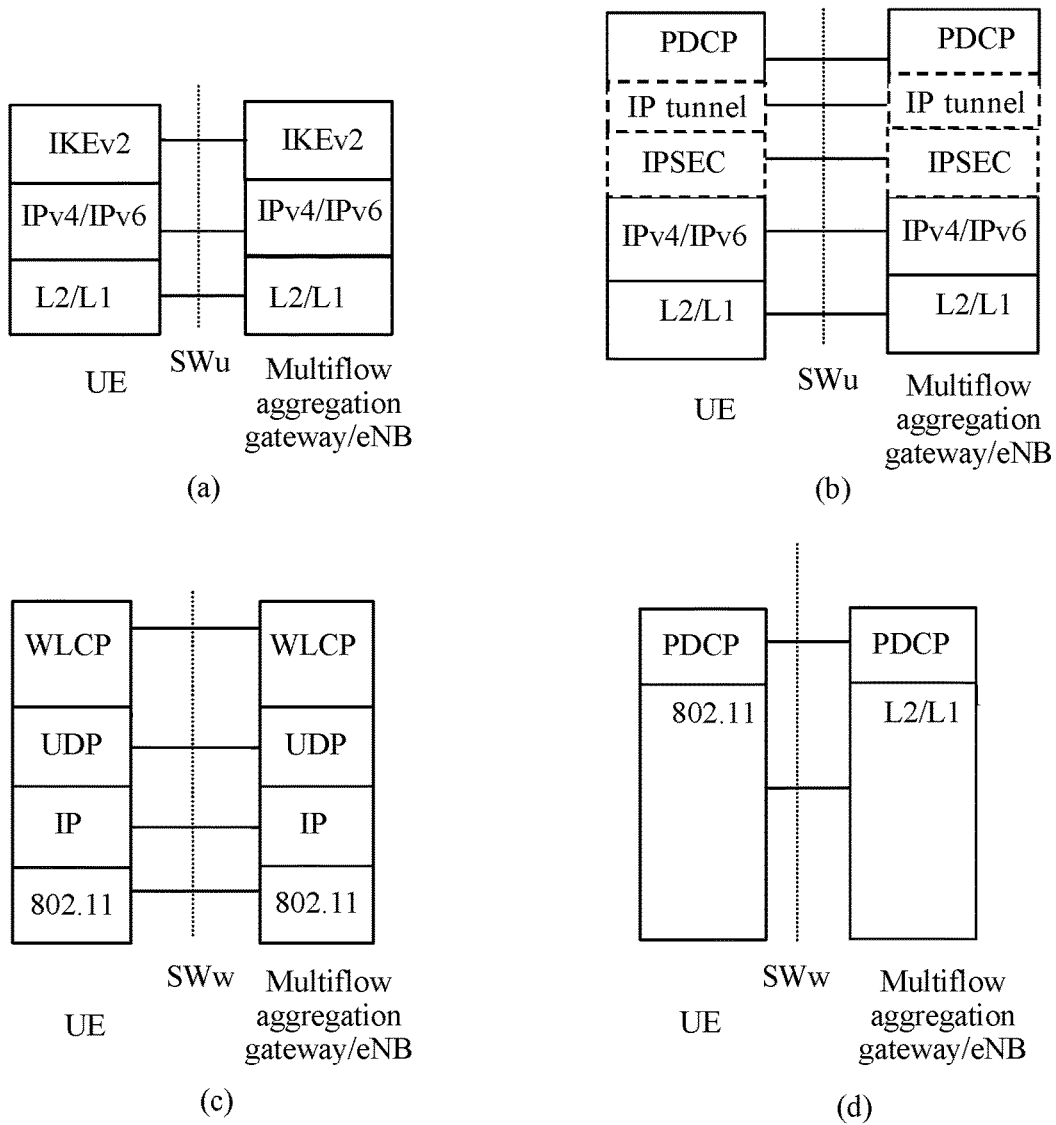
FIG. 7 is a schematic structural diagram of a control plane protocol stack and a user plane protocol stack between UE and an eNB.

In this embodiment, the first multiflow aggregation channel is established between the UE and the eNB by using a control plane protocol, and data is transmitted by using a user plane protocol after the first multiflow aggregation channel is established. FIG. 7 is a schematic structural diagram of a control plane protocol stack and a user plane protocol stack between the UE and the eNB. As shown in FIG. 7, FIG. 7a is a control plane protocol stack in an IKEv2 protocol. An interface between the UE and the eNB is an SWu interface. A protocol stack on a UE side is sequentially L2/L1, IPv4/IPv6, and IKEv2 from a bottom layer to a higher layer. A protocol stack on an eNB side is the same as that on the UE side. FIG. 7b is a user plane protocol stack in an IKEv2 protocol. An interface between the UE and the eNB is an SWu interface. A protocol stack on a UE side is sequentially an L2/L1 layer, an IPv4/IPv6 layer, an IPsec layer, an IP tunnel layer, and a PDCP layer from a bottom layer to a higher layer. A protocol stack on an eNB side is the same as that on the UE side. The IP tunnel layer and the IPsec layer are optional layers. FIG. 7c is a control plane protocol stack in a WLCP protocol. An interface between the UE and the eNB is an SWw interface. A protocol stack on a UE side is sequentially an 802.11 layer, an IP layer, a UDP layer, and a WLCP layer from a bottom layer to a higher layer. A protocol stack on an eNB side is the same as that on the UE side. FIG. 7d is a user plane protocol stack in a WLCP protocol. An interface between the UE and the eNB is an SWw interface. A protocol stack on a UE side is sequentially an 802.11 layer and a PDCP layer from a bottom layer to a higher layer. A protocol stack on an eNB side is the same as that on the UE side.

In this embodiment, the UE and the eNB need to sort data packets on a same bearer together, but the first multiflow aggregation channel between the UE and the eNB is not a channel of a bearer granularity. Therefore, some special processing needs to be performed on a user plane. Detailed descriptions are as followings:

In this embodiment, the first multiflow aggregation channel may be a channel of a UE granularity or a PDN connection granularity. When sending an uplink traffic flow, the UE needs to add, to a PDCP header of each data packet in a second uplink data flow, a bearer identifier corresponding to the uplink traffic flow. After receiving the second uplink data flow, the eNB determines, according to the bearer identifier corresponding to the uplink traffic flow, a bearer corresponding to the second uplink data flow, and performs aggregation according to the bearer corresponding to the second uplink data flow. When the eNB sends a downlink traffic flow, the eNB adds, to a PDCP header of a data packet in a second downlink data flow, a bearer identifier corresponding to the downlink traffic flow, and sends the second downlink data flow to the UE. After receiving the second downlink data flow, the UE determines, according to the bearer identifier corresponding to the downlink traffic flow, a bearer corresponding to the second downlink data flow.

If the MME sends, to the eNB, a traffic flow template corresponding to a bearer corresponding to the uplink traffic flow, the UE may not add, to the second uplink data flow, the bearer identifier corresponding to the uplink traffic flow. In this case, after receiving the second uplink data flow transmitted on the first multiflow aggregation channel, the eNB may match the second uplink data flow and the traffic flow template, to determine the bearer corresponding to the second uplink data flow. Likewise, the eNB may not add, to the second downlink data flow, the bearer identifier corresponding to the downlink traffic flow. After receiving the second downlink data flow, the UE matches the second downlink data flow and the traffic flow template, to determine the bearer corresponding to the second downlink data flow.

Figure 8:
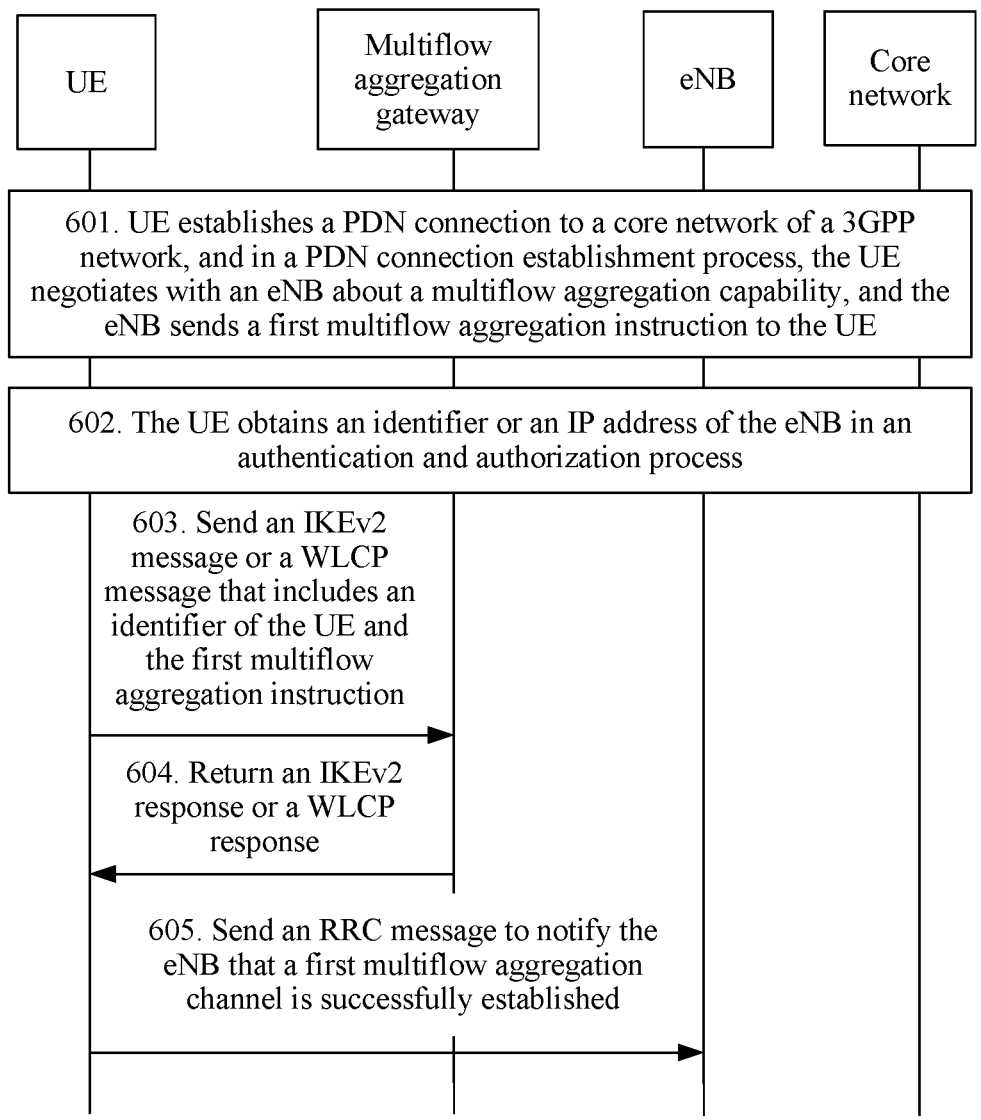
FIG. 8 is a signaling flowchart of establishing a first multiflow aggregation channel according to Embodiment 6 of the present invention.

FIG. 8 is a signaling flowchart of establishing a first multiflow aggregation channel according to Embodiment 6 of the present invention. Different from Embodiment 5, in this embodiment, a multiflow aggregation gateway and an eNB are disposed independently, and an S20 interface is newly added between the eNB and the multiflow aggregation gateway. The S20 interface is an interface newly defined in the present invention, and is used for interaction between the eNB and the multiflow aggregation gateway. In this embodiment, a user plane channel between the eNB and the multiflow aggregation gateway is a device-level IP tunnel or a preconfigured private IP channel. The channel does not need to be established by means of control plane signaling transfer. Therefore, there is no control plane protocol stack but only a user plane protocol stack on the S20 interface. As shown in FIG. 8, a method provided in this embodiment may include the following steps.

Step 601: UE establishes a PDN connection to a core network of a 3GPP network, and in a PDN connection establishment process, the UE negotiates with an eNB about a multiflow aggregation capability, and the eNB sends a first multiflow aggregation instruction to the UE.

Step 602: The UE obtains an identifier or an IP address of a multiflow aggregation gateway in an authentication and authorization process.

Step 603: The UE sends an IKEv2 message or a WLCP message to the multiflow aggregation gateway, where the IKEv2 message or the WLCP message includes an identifier of the UE and the first multiflow aggregation instruction.

Step 604: The multiflow aggregation gateway returns an IKEv2 response or a WLCP response to the UE, to determine that a first multiflow aggregation channel is successfully established.

For specific implementations of steps 601 to 604, refer to related descriptions of steps 501 to 504 in Embodiment 5. Details are not described herein again.

Step 605: The UE sends an RRC message to the eNB, to notify the eNB that the first multiflow aggregation channel is successfully established.

In this embodiment, in a process of establishing the first multiflow aggregation channel, there is no signaling exchange between the multiflow aggregation gateway and the eNB, and the eNB does not know that the first multiflow aggregation channel is successfully established. Therefore, the UE actively notifies the eNB that the first multiflow aggregation channel is successfully established.

In this embodiment, a structure of a control plane protocol stack between the UE and the multiflow aggregation gateway is the same as the structure of the control plane protocol stack between the UE and the multiflow aggregation gateway shown in FIG. 7. For details, refer to related descriptions in Embodiment 5. FIG. 9 is a schematic structural diagram of a user plane protocol stack among the UE, the multiflow aggregation gateway, and the eNB. As shown in FIG. 9, FIG. 9a is a user plane protocol stack in an IKEv2 protocol. An interface between the UE and the multiflow aggregation gateway is an SWw interface, and an interface between the multiflow aggregation gateway and the eNB is an S20 interface. A protocol stack on a UE side is sequentially an L2/L1 layer, an IPv4/IPv6 layer, an IPsec layer, an IP tunnel layer, and a PDCP layer from a bottom layer to a higher layer. The multiflow aggregation gateway needs to separately communicate with the UE and the eNB. The multiflow aggregation gateway communicates with the UE and the eNB by using different protocol stacks. A protocol stack used by the multiflow aggregation gateway to communicate with the UE is sequentially an L2/L1 layer, an IPv4/IPv6 layer, an IPsec layer, and an IP tunnel layer from a bottom layer to a higher layer. A protocol stack used by the multiflow aggregation gateway to communicate with the eNB is sequentially L2/L1 and IPv4/IPv6 from a bottom layer to a higher layer. A protocol stack on an eNB side is sequentially an L2/L1 layer, an IPv4/IPv6 layer, and a PDCP layer from a bottom layer to a higher layer. The IP tunnel layer and the IPsec layer are optional layers. FIG. 9b is a user plane protocol stack in a WLCP protocol. An interface between the UE and the multiflow aggregation gateway is an SWw interface. A protocol stack on a UE side is sequentially an 802.11 layer and a PDCP layer from a bottom layer to a higher layer. A protocol stack used by the multiflow aggregation gateway to communicate with the UE includes an 802.11 layer. A protocol stack used by the multiflow aggregation gateway to communicate with the eNB is sequentially an L2/L1 layer and an IP layer from a bottom layer to a higher layer. A protocol stack on an eNB side is sequentially an L2/L1 layer, an IP layer, and a PDCP layer from a bottom layer to a higher layer.

In this embodiment, a second subchannel between the multiflow aggregation gateway and the eNB is a channel of a UE granularity, a device granularity, or a PDN connection granularity. When the UE sends an uplink traffic flow, if the second subchannel is a channel of a UE granularity or a PDN connection granularity, the UE needs to add, to a second uplink data flow, a bearer identifier corresponding to the uplink traffic flow. After receiving the second uplink data flow, the multiflow aggregation gateway determines, according to a second uplink data flow receiving channel, to send the second uplink data flow to the second subchannel corresponding to the UE. After receiving the second uplink data flow, the eNB determines, according to the bearer identifier corresponding to the uplink traffic flow, a bearer corresponding to the second uplink data flow. If the second subchannel is a channel of a device granularity, the UE needs to add, to a second uplink data flow, the identifier of the UE and a bearer identifier corresponding to the uplink traffic flow. After receiving the second uplink data flow, the multiflow aggregation gateway sends the second uplink data flow to the eNB by using the channel of a device granularity. After receiving the second uplink data flow, the eNB determines, according to the identifier of the UE and the bearer identifier corresponding to the uplink traffic flow, a bearer corresponding to the second uplink data flow.

When sending a downlink traffic flow, if the second subchannel is a channel of a UE granularity or a PDN connection granularity, the eNB needs to add, to a second downlink data flow, a bearer identifier corresponding to the downlink traffic flow. After receiving the second downlink data flow, the multiflow aggregation gateway sends the second downlink data flow to the corresponding UE according to a second downlink data flow receiving channel. The UE determines, according to the bearer identifier that is corresponding to the downlink traffic flow and that is in the second downlink data flow, a bearer corresponding to the second downlink data flow. If the second subchannel is a channel of a device granularity, the eNB needs to add, to a second downlink data flow, the identifier of the UE and a bearer identifier corresponding to the downlink traffic flow. After receiving the second downlink data flow, the multiflow aggregation gateway sends the second downlink data flow to the corresponding UE according to the identifier of the UE. The UE determines, according to the bearer identifier that is corresponding to the downlink traffic flow and that is in the second downlink data flow, a bearer corresponding to the second downlink data flow.

Figure 10:
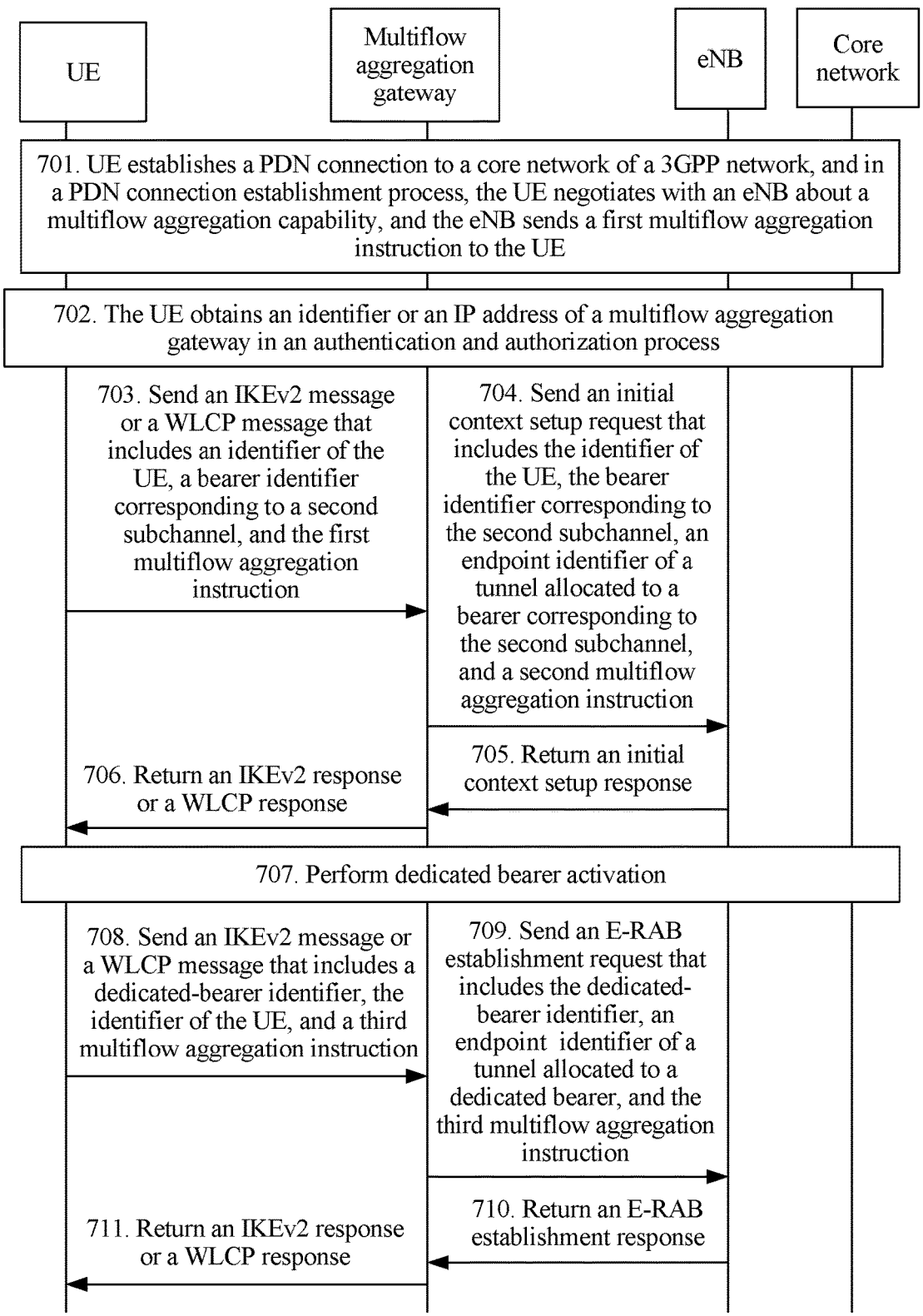
FIG. 10 is a signaling flowchart of establishing a first multiflow aggregation channel according to Embodiment 7 of the present invention.

FIG. 10 is a signaling flowchart of establishing a first multiflow aggregation channel according to Embodiment 7 of the present invention. A difference between this embodiment and Embodiment 6 is as follows: In this embodiment, there are both a control plane protocol stack and a user plane protocol stack on an S20 interface. A second subchannel between a multiflow aggregation gateway and an eNB is established by using the control plane protocol stack and S20-AP signaling, and the user plane protocol stack is a GTP-U protocol. As shown in FIG. 10, a method provided in this embodiment may include the following steps.

Step 701: UE establishes a PDN connection to a core network of a 3GPP network, and in a PDN connection establishment process, the UE negotiates with an eNB about a multiflow aggregation capability, and the eNB sends a first multiflow aggregation instruction to the UE.

Step 702: The UE obtains an identifier or an IP address of a multiflow aggregation gateway in an authentication and authorization process.

Step 703: The UE sends an IKEv2 message or a WLCP message to the multiflow aggregation gateway, where the IKEv2 message or the WLCP message includes an identifier of the UE, a bearer identifier corresponding to a second subchannel, and a first multiflow aggregation instruction.

Step 704: The multiflow aggregation gateway sends an initial context setup request to the eNB, where the initial context setup request includes the identifier of the UE, the bearer identifier corresponding to the second subchannel, an endpoint identifier of a tunnel allocated to a bearer corresponding to the second subchannel, and the second multiflow aggregation instruction.

After receiving the IKEv2 message or the WLCP message, the multiflow aggregation gateway allocates, according to the bearer identifier corresponding to the second subchannel and the second multiflow aggregation instruction, the tunnel to the bearer corresponding to the second subchannel, generates the initial context setup request, adds, to the initial context setup request, the endpoint identifier (TEID for short) of the tunnel allocated to the bearer corresponding to the second subchannel, and sends the initial context setup request to the eNB.

Step 705: The eNB returns an initial context setup response to the multiflow aggregation gateway.

After receiving the initial context setup request, the eNB allocates, according to the bearer identifier corresponding to the second subchannel, a tunnel to the bearer corresponding to the second subchannel, adds an endpoint identifier of the allocated tunnel to the initial context setup response, and sends the initial context setup response to the multiflow aggregation gateway. The bearer corresponding to the second subchannel is successfully established by using step 704 and step 705.

Step 706: The multiflow aggregation gateway returns an IKEv2 response or a WLCP response to the UE.

After the multiflow aggregation gateway returns the IKEv2 response or the WLCP response to the UE, a first multiflow aggregation channel is successfully established.

Step 707: Perform dedicated bearer activation.

Because of a service requirement, the UE may subsequently establish a dedicated bearer on the PDN connection, and in a dedicated-bearer establishment process, the eNB indicates that a second multiflow aggregation channel on a WLAN side also needs to or is allowed to be established for the dedicated bearer. For example, the eNB adds a third multiflow aggregation instruction to an RRC connection reconfiguration message that is in the bearer establishment process, and sends the third multiflow aggregation instruction to the UE. The third multiflow aggregation instruction is used to instruct the UE to establish, for the dedicated bearer, the second multiflow aggregation channel between the UE and the eNB via a non-3GPP network. The UE establishes, by using the following steps, the second multiflow aggregation channel corresponding to the dedicated bearer.

Step 708: The UE sends an IKEv2 message or a WLCP message to the multiflow aggregation gateway, where the IKEv2 message or the WLCP message includes a dedicated-bearer identifier, the identifier of the UE, and the third multiflow aggregation instruction.

Step 709: The multiflow aggregation gateway sends an E-RAB establishment request to the eNB, where the E-RAB establishment request includes the identifier of the UE, the dedicated-bearer identifier, an endpoint identifier of a tunnel allocated to the dedicated bearer, and the third multiflow aggregation instruction.

After receiving the IKEv2 message or the WLCP message, the multiflow aggregation gateway allocates the tunnel to the dedicated bearer according to the dedicated bearer identifier, adds, to the E-RAB establishment request, the endpoint identifier of the tunnel allocated to the dedicated bearer by the multiflow aggregation gateway, and sends the E-RAB establishment request to the eNB.

Step 710: The eNB returns an E-RAB establishment response to the multiflow aggregation gateway.

The eNB allocates a tunnel to the dedicated bearer according to the dedicated-bearer identifier, adds, to the E-RAB establishment response, an endpoint identifier of the tunnel allocated to the dedicated bearer by the eNB, and sends the E-RAB establishment response to the multiflow aggregation gateway.

Step 711: The multiflow aggregation gateway returns an IKEv2 response or a WLCP response to the UE.

In this embodiment, a structure of a user plane protocol stack among the UE, the multiflow aggregation gateway, and the eNB is the same as the structure of the user plane protocol stack shown in FIG. 9. For details, refer to related descriptions in Embodiment 6. FIG. 11 is a schematic structural diagram of a control plane protocol stack among the UE, the multiflow aggregation gateway, and the eNB. As shown in FIG. 11, FIG. 11*a* is a control plane protocol stack in an IKEv2 protocol. An interface between the UE and the multiflow aggregation gateway is an SWu interface, and an interface between the multiflow aggregation gateway and the eNB is an S20 interface. A protocol stack on a UE side is sequentially L2/L1, IPv4/IPv6, and IKEv2 from a bottom layer to a higher layer. A protocol stack used by the multiflow aggregation gateway to communicate with the UE is the same as that on the UE side. A protocol stack used by the multiflow aggregation gateway to communicate with the eNB is sequentially an L2/L1 layer, an IPv4/IPv6 layer, an SCTP layer, and an S20-AP layer from a bottom layer to a higher layer. S20-AP represents a control plane protocol between the multiflow aggregation gateway and the eNB. A protocol stack on an eNB side is the same as the protocol stack used by the multiflow aggregation gateway to communicate with the eNB. FIG. 11*b* is a control plane protocol stack in a WLCP protocol. A protocol stack on a UE side is sequentially an 802.11 layer, an IP layer, a UDP layer, and a WLCP layer from a bottom layer to a higher layer. A protocol stack used by the multiflow aggregation gateway to communicate with the UE is the same as the protocol stack on the UE side. A protocol stack used by the multiflow aggregation gateway to communicate with the eNB is sequentially an L2/L1 layer, an IP layer, an SCTP layer, and an S20-AP layer from a bottom layer to a higher layer. A protocol stack on an eNB side is the same as the protocol stack used by the multiflow aggregation gateway to communicate with the eNB.

In this embodiment, the second subchannel between the multiflow aggregation gateway and the eNB is a channel of a bearer granularity, and a first subchannel between the UE and the multiflow aggregation gateway may not be a channel of a bearer granularity. The UE, the multiflow aggregation gateway, and the eNB need to sort data packets on a same bearer together. In this embodiment, when sending an uplink traffic flow, the UE adds, to a second uplink data flow, a bearer identifier corresponding to the uplink traffic flow. After receiving the second uplink data flow, the multiflow aggregation gateway determines, according to the bearer identifier that is corresponding to the uplink traffic flow and that is included in the second uplink data flow, a bearer corresponding to the second uplink data flow, and sends the second uplink data flow to the eNB by using the bearer corresponding to the second uplink data flow. Because the second subchannel is a channel of a bearer granularity, the eNB knows the bearer corresponding to the second uplink data flow, and does not need to determine the bearer corresponding to the second uplink data flow again, but directly aggregates the second uplink data flow with a first uplink data flow. Likewise, the eNB add, to a second downlink data flow, an identifier corresponding to a downlink traffic flow. When receiving the second downlink data flow sent by the eNB, the multiflow aggregation gateway determines, according to a second downlink data flow receiving channel, a bearer corresponding to the second downlink data flow. The bearer corresponding to the second downlink data flow is the same as a bearer corresponding to the downlink traffic flow. The multiflow aggregation gateway adds, to the second downlink data flow, the bearer corresponding to the downlink traffic flow, and determines, according to the bearer corresponding to the second downlink data flow, specific UE to which the second downlink data flow is sent.

Figure 12:
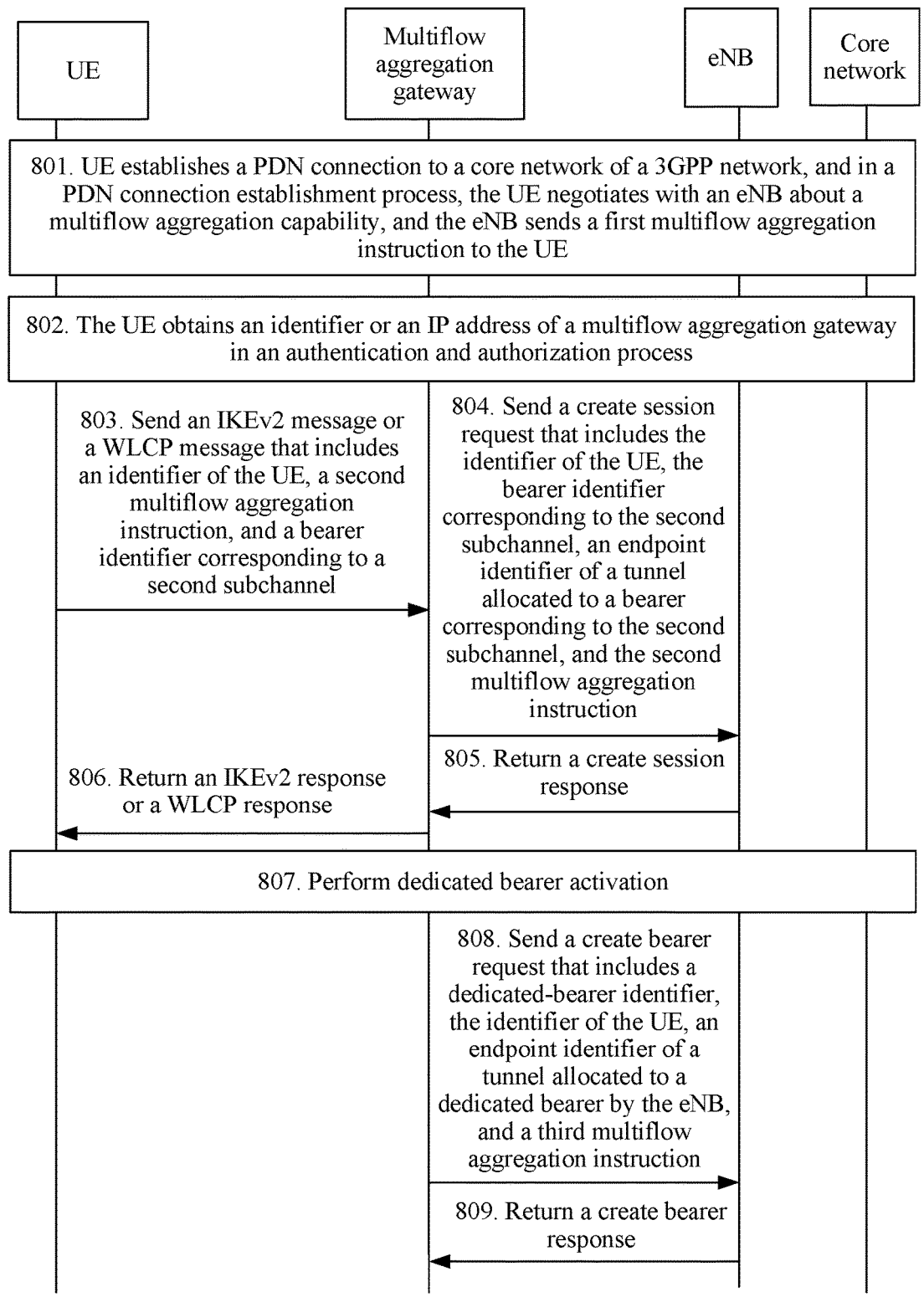
FIG. 12 is a signaling flowchart of establishing a first multiflow aggregation channel according to Embodiment 8 of the present invention.

FIG. 12 is a signaling flowchart of establishing a first multiflow aggregation channel according to Embodiment 8 of the present invention. A difference between this embodiment and Embodiment 7 is as follows: In this embodiment, a second subchannel between a multiflow aggregation gateway and an eNB is established by using a control plane protocol stack and GTP-C signaling, and a user plane protocol stack is still GTP-U. As shown in FIG. 12, a method provided in this embodiment may include the following steps.

Step 801: UE establishes a PDN connection to a core network of a 3GPP network, and in a PDN connection establishment process, the UE negotiates with an eNB about a multiflow aggregation capability, and the eNB sends a first multiflow aggregation instruction to the UE.

Step 802: The UE obtains an identifier or an IP address of a multiflow aggregation gateway in an authentication and authorization process.

Step 803: The UE sends an IKEv2 message or a WLCP message to the multiflow aggregation gateway, where the IKEv2 message or the WLCP message includes an identifier of the UE, a second multiflow aggregation instruction, and a bearer identifier corresponding to a second subchannel.

Step 804: The multiflow aggregation gateway sends a create session request to the eNB, where the create session request includes the identifier of the UE, the bearer identifier corresponding to the second subchannel, an endpoint identifier of a tunnel allocated by the multiflow aggregation gateway to a bearer corresponding to the second subchannel, and the second multiflow aggregation instruction.

Step 805: The eNB returns a create session response to the multiflow aggregation gateway.

The create session response includes an endpoint identifier of a tunnel allocated by the eNB to the bearer corresponding to the second subchannel.

Step 806: The multiflow aggregation gateway returns an IKEv2 response or a WLCP response to the UE.

Step 807: Perform dedicated bearer activation.

Step 808: The eNB sends a create bearer request to the multiflow aggregation gateway, where the create bearer request includes a dedicated-bearer identifier, the identifier of the UE, an endpoint identifier of a tunnel allocated to the dedicated bearer by the eNB, and a third multiflow aggregation instruction.

Step 809: The multiflow aggregation gateway returns a create bearer response to the eNB.

The create bearer response includes an endpoint identifier of a tunnel allocated to the dedicated bearer by the multiflow aggregation gateway.

In this embodiment, a structure of a user plane protocol stack among the UE, the multiflow aggregation gateway, and the eNB is the same as the structure of the user plane protocol stack shown in FIG. 7. For details, refer to related descriptions in Embodiment 6. In this embodiment, a structure of a control plane protocol stack among the UE, the multiflow aggregation gateway, and the eNB is basically the same as the structure of the control plane protocol stack shown in FIG. 11. A difference lies in that protocols at highest two layers of a protocol stack between a multiflow aggregation gateway and an eNB are different. In this embodiment, protocols at highest two layers of a protocol stack between the multiflow aggregation gateway and the eNB are a GTP-C protocol and a UDP protocol, and protocols at highest two layers of a protocol stack between a multiflow aggregation gateway and an eNB shown in FIG. 11 are an S20-AP protocol and an SCTP protocol.

In this embodiment, the second subchannel between the multiflow aggregation gateway and the eNB is a channel of a bearer granularity, and a first subchannel between the UE and the multiflow aggregation gateway may not be a channel of a bearer granularity. The UE, the multiflow aggregation gateway, and the eNB need to sort data packets on a same bearer together. For a specific implementation, refer to descriptions in Embodiment 7. Details are not described herein again.

Figure 13:
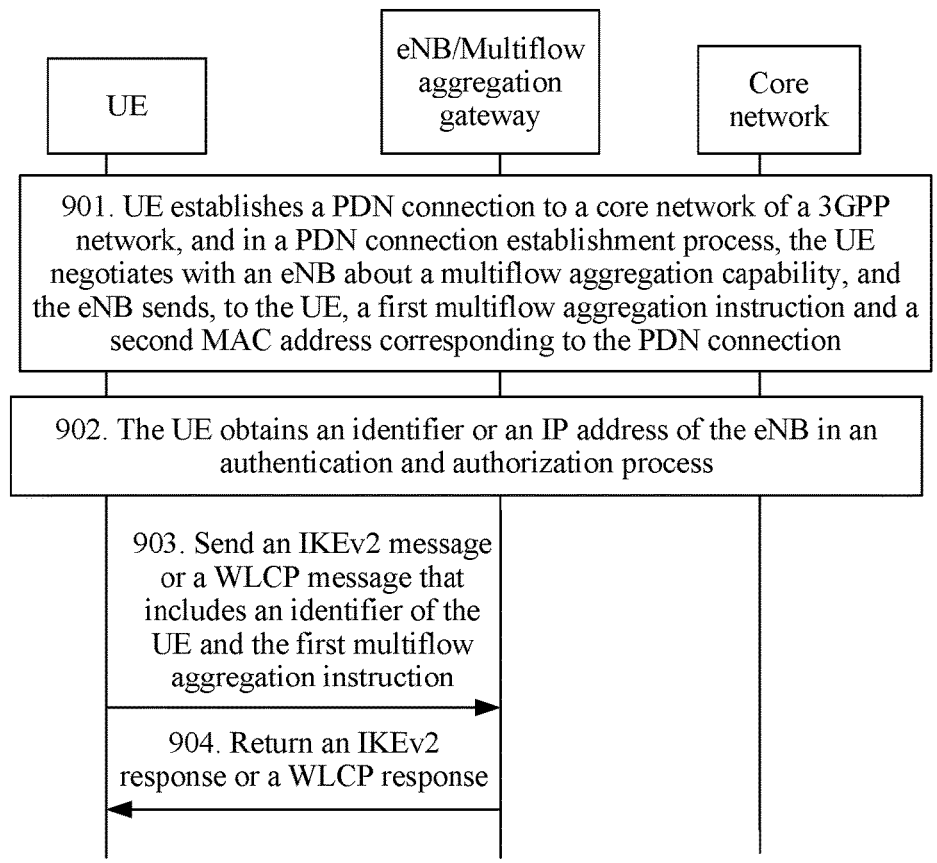
FIG. 13 is a signaling flowchart of establishing a first multiflow aggregation channel according to Embodiment 9 of the present invention.

FIG. 13 is a signaling flowchart of establishing a first multiflow aggregation channel according to Embodiment 9 of the present invention. Like the scenario in Embodiment 5, a multiflow aggregation gateway is integrated in an eNB, but a difference is as follows: In this embodiment, a first multiflow aggregation channel between UE and the eNB is a MAC-based tunnel, and the eNB is a first-hop router accessed by the UE in a WLAN. As shown in FIG. 13, a method provided in this embodiment may include the following steps.

Step 901: UE establishes a PDN connection to a core network of a 3GPP network, and in a PDN connection establishment process, the UE negotiates with an eNB about a multiflow aggregation capability, and the eNB sends, to the UE, a first multiflow aggregation instruction and a second MAC address corresponding to the PDN connection.

In the PDN connection establishment process, the eNB may send, to the UE by using an RRC connection reconfiguration message, the second MAC address corresponding to the PDN connection. Actually, establishment of the PDN connection is accompanied by establishment of a default bearer. Herein, the second MAC address corresponding to the PDN connection is also referred to as a MAC address corresponding to the default bearer. The second MAC address is used to identify the PDN connection.

Step 902: The UE obtains an identifier or an IP address of the eNB in an authentication and authorization process.

Step 903: The UE sends an IKEv2 message or a WLCP message to the eNB, where the IKEv2 message or the WLCP message includes an identifier of the UE and the first multiflow aggregation instruction.

Step 904: The eNB returns an IKEv2 response or a WLCP response to the UE.

If the eNB does not send the second MAC address to the UE in step 901, the eNB may add, to the IKEv2 response or the WLCP response, the second MAC address corresponding to the PDN connection.

In this embodiment, a structure of a user plane protocol stack among the UE, the multiflow aggregation gateway, and the eNB is the same as the structure of the user plane protocol stack in the WLCP protocol shown in FIG. 7. For details, refer to related descriptions in Embodiment 6. Details are not described herein again.

In this embodiment, a multiflow aggregation channel between the UE and the eNB is a channel of a PDN connection granularity. When the UE sends an uplink traffic flow, the UE splits the uplink traffic flow into a first uplink data flow and a second uplink data flow, encapsulates a data packet in the second uplink data flow by using the second MAC address, and adds, to the second uplink data flow, a bearer identifier corresponding to the uplink traffic flow. After receiving the second uplink data flow, the eNB determines, according to the bearer identifier corresponding to the uplink traffic flow and the second MAC address, a bearer corresponding to the second uplink data flow, and determines, according to a first uplink data flow receiving channel, a bearer corresponding to the first uplink data flow. If the bearer corresponding to the second uplink data flow is the same as the bearer corresponding to the first uplink data flow, the eNB aggregates the first uplink data flow with the second uplink data flow to form one traffic flow, and sends the traffic flow by using the same bearer. When the eNB sends a downlink traffic flow to the UE, the eNB encapsulates a data packet in a second downlink data flow by using the second MAC address, and adds, to the second downlink data flow, a bearer identifier corresponding to the downlink traffic flow. After receiving a first downlink data flow and the second downlink data flow, the UE determines, according to the bearer identifier corresponding to the downlink traffic flow and the second MAC address, a bearer corresponding to the second downlink data flow, and aggregates the first downlink data flow with the second downlink data flow.

Alternatively, the UE may establish a dedicated bearer on the PDN connection, and the eNB allocates first MAC address to the dedicated bearer, and sends, in a dedicated-bearer establishment process, the first MAC address to the UE by using an RRC message. When the UE subsequently sends an uplink traffic flow, the UE encapsulates a data packet in a second uplink data flow by using the first MAC address. After receiving the second uplink data flow, the eNB determines, according to the first MAC address, a bearer corresponding to the second uplink data flow. When the eNB sends a downlink traffic flow to the UE, the eNB encapsulates a data packet in a second downlink data flow by using the first MAC address. After receiving a first downlink data flow and the second downlink data flow, the UE determines, according to the first MAC address, a bearer corresponding to the second downlink data flow.

Figure 14:
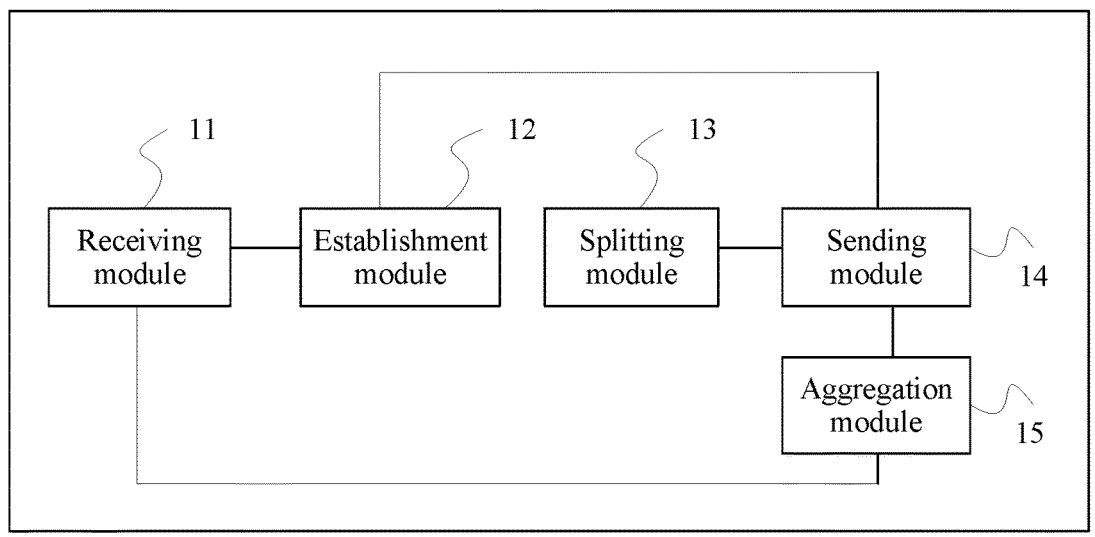
FIG. 14 is a schematic structural diagram of UE according to Embodiment 10 of the present invention.

FIG. 14 is a schematic structural diagram of UE according to Embodiment 10 of the present invention. As shown in FIG. 14, the UE provided in this embodiment includes: a receiving module 11, an establishment module 12, a splitting module 13, a sending module 14, and an aggregation module 15.

The receiving module 11 is configured to receive a first multiflow aggregation instruction sent by an eNB in a 3GPP network. The first multiflow aggregation instruction is used to instruct the UE to establish a first multiflow aggregation channel between the UE and the eNB via a non-3GPP network. The first multiflow aggregation channel is used for transmitting a part of data in an uplink traffic flow of the UE or a part of data in a downlink traffic flow for the UE, where the part of data is offloaded to the non-3GPP network for transmission, and other data in the uplink traffic flow or other data in the downlink traffic flow is offloaded to a 3GPP channel in the 3GPP network for transmission.

The establishment module 12 is configured to establish the first multiflow aggregation channel.

The splitting module 13 is configured to split the uplink traffic flow of the UE into a first uplink data flow and a second uplink data flow.

The sending module 14 is configured to: send the first uplink data flow to the eNB by using the 3GPP channel, and send the second uplink data flow to the eNB by using the first multiflow aggregation channel, so that the eNB aggregates the first uplink data flow with the second uplink data flow to form one traffic flow; or the receiving module 11 is further configured to: receive a first downlink data flow sent by the eNB by using the 3GPP channel, and receive a second downlink data flow sent by the eNB by using the first multiflow aggregation channel.

The aggregation module 15 is configured to aggregate the first downlink data flow with the second downlink data flow to form one traffic flow. The downlink traffic flow for the UE is split by the eNB into the first downlink data flow and the second downlink data flow.

Optionally, the first multiflow aggregation channel includes a first subchannel between the UE and a multiflow aggregation gateway and a second subchannel between the multiflow aggregation gateway and the eNB, and the establishment module 12 is specifically configured to:

obtain an IP address of the multiflow aggregation gateway;

send a first multiflow aggregation channel establishment request to the multiflow aggregation gateway according to the IP address of the multiflow aggregation gateway, where the first multiflow aggregation channel establishment request includes a second multiflow aggregation instruction and an identifier of the UE, the second multiflow aggregation instruction is used to instruct the multiflow aggregation gateway to establish the first multiflow aggregation channel, and the identifier of the UE is an identifier of the UE in the 3GPP network;

receive a first multiflow aggregation channel establishment response returned by the multiflow aggregation gateway, to confirm that the multiflow aggregation channel is successfully established; and send a notification message to the eNB, where the notification message is used to notify the eNB that the first multiflow aggregation channel is successfully established.

When obtaining the IP address of the multiflow aggregation gateway, the establishment module 12 is specifically configured to: receive, in an RRC connection establishment process, an RRC message sent by the eNB, and obtain the IP address of the multiflow aggregation gateway according to the RRC message, where the RRC message includes the IP address of the multiflow aggregation gateway or an identifier of the multiflow aggregation gateway; or receive, in an access authentication process of accessing the non-3GPP network, an authentication message sent by the non-3GPP network, and obtain the IP address of the multiflow aggregation gateway according to the authentication message, where the authentication message includes the IP address of the multiflow aggregation gateway or an identifier of the multiflow aggregation gateway; or send a fully-qualified domain name request to a domain name server, and receive a fully-qualified domain name response returned by the domain name server, where the fully-qualified domain name request is used for obtaining the IP address of the multiflow aggregation gateway, and the fully-qualified domain name response includes the IP address of the multiflow aggregation gateway.

Optionally, the first multiflow aggregation channel includes a third subchannel between the UE and the eNB, and the establishment module 12 is specifically configured to:

obtain an IP address of the eNB;

send a second multiflow aggregation channel establishment request to the eNB according to the IP address of the eNB, where the second multiflow aggregation channel establishment request includes a third multiflow aggregation instruction and an identifier of the UE, the third multiflow aggregation instruction is used to instruct the eNB to establish the first multiflow aggregation channel, and the identifier of the UE is an identifier of the UE in the 3GPP network; and receive a second multiflow aggregation channel establishment response returned by the eNB, to confirm that the first multiflow aggregation channel is successfully established.

In this embodiment, when sending the second uplink data flow to the eNB by using the first multiflow aggregation channel, the sending module 14 is specifically configured to:

add, to the second uplink data flow, a bearer identifier corresponding to the uplink traffic flow, and send the second uplink data flow to the eNB by using the first multiflow aggregation channel, where the second uplink data flow includes the bearer identifier corresponding to the uplink traffic flow; or add, to the second uplink data flow, the identifier of the UE and a bearer identifier corresponding to the uplink traffic flow, and send the second uplink data flow to the eNB by using the first multiflow aggregation channel, where the second uplink data flow includes the identifier of the UE and the bearer identifier corresponding to the uplink traffic flow, and the identifier of the UE is the identifier of the UE in the 3GPP network; or encapsulate a data packet in the second uplink data flow by using a first Media Access Control MAC address, and send the encapsulated second uplink data flow to the eNB by using the first multiflow aggregation channel, where the second uplink data flow includes the first MAC address, and the first MAC address is a MAC address corresponding to a bearer corresponding to the uplink traffic flow; or encapsulate a data packet in the second uplink data flow by using a second MAC address, add, to the encapsulated second uplink data flow, a bearer identifier corresponding to the uplink traffic flow, and send the second uplink data flow to the eNB by using the first multiflow aggregation channel, where the second uplink data flow includes the second MAC address and the bearer identifier corresponding to the uplink traffic flow, and the second MAC address is a MAC address corresponding to a packet data network PDN connection corresponding to the uplink traffic flow.

In this embodiment, the second downlink data flow includes a bearer identifier corresponding to the downlink traffic flow, or the identifier of the UE and a bearer identifier corresponding to the downlink traffic flow, or a first MAC address, or a second MAC address and a bearer identifier corresponding to the downlink traffic flow. Before the aggregation module 15 aggregates the first downlink data flow with the second downlink data flow to form one traffic flow, the aggregation module 15 is further configured to: determine, according to information included in the second downlink data flow, a bearer corresponding to the second downlink data flow, and determine that a bearer corresponding to the first downlink data flow and the bearer corresponding to the second downlink data flow are a same bearer.

Optionally, the receiving module 11 is further configured to receive a traffic flow template sent by an MME in the 3GPP network. The traffic flow template is corresponding to a bearer corresponding to the downlink traffic flow, each bearer is corresponding to one traffic flow template, and the traffic flow template includes matching information of the bearer corresponding to the downlink traffic flow. Before the aggregation module 15 aggregates the first downlink data flow with the second downlink data flow to form one traffic flow, the aggregation module 15 is further configured to: match the second downlink data flow and the traffic flow template, to determine a bearer corresponding to the second downlink data flow, and determine that a bearer corresponding to the first downlink data flow and a bearer corresponding to the second downlink data flow passes are a same bearer.

If the UE subsequently establishes a dedicated bearer, after the UE establishes the dedicated bearer, the receiving module 11 is further configured to receive a fourth multiflow aggregation instruction sent by the eNB. The fourth multiflow aggregation instruction is used to instruct the UE to establish, for the dedicated bearer, a second multiflow aggregation channel between the UE and the eNB via the non-3GPP network. The second multiflow aggregation channel is used for transmitting a part of data in an uplink traffic flow transmitted on the dedicated bearer or a part of data in a downlink traffic flow transmitted on the dedicated bearer, where the part of data is offloaded to the non-3GPP network for transmission, and other data in the uplink traffic flow transmitted on the dedicated bearer or other data in the downlink traffic flow transmitted on the dedicated bearer is offloaded to the 3GPP channel for transmission. Correspondingly, the establishment module 12 is further configured to establish the second multiflow aggregation channel.

In this embodiment, the sending module 14 is further configured to send multiflow aggregation capability information of the UE to the eNB before the receiving module 11 receives the first multiflow aggregation instruction sent by the eNB, so that the eNB determines, according to the multiflow aggregation capability information, whether to return the multiflow aggregation instruction to the UE. The multiflow aggregation capability information is used to indicate whether the UE supports a multiflow aggregation capability.

The UE in this embodiment can be used to perform the methods provided in Embodiment 1, Embodiment 2, and Embodiment 5 to Embodiment 9. Specific implementations and technical effects thereof are similar to those of the methods, and details are not described herein.

Figure 15:
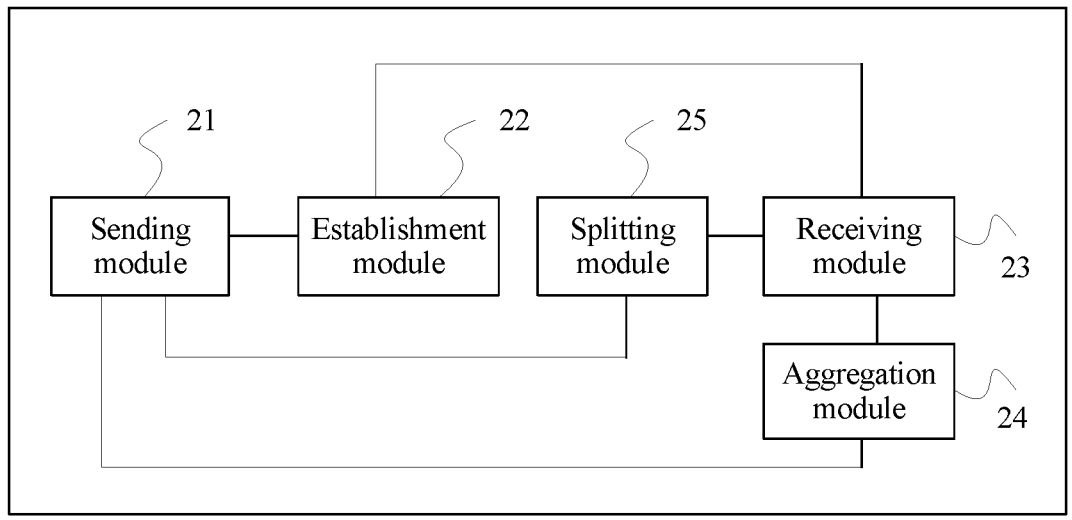
FIG. 15 is a schematic structural diagram of an eNB according to Embodiment 11 of the present invention.

FIG. 15 is a schematic structural diagram of an eNB according to Embodiment 11 of the present invention. As shown in FIG. 11, the eNB provided in this embodiment includes: a sending module 21, an establishment module 22, a receiving module 23, an aggregation module 24, and a splitting module 25.

The sending module 21 is configured to send a first multiflow aggregation instruction to UE. The first multiflow aggregation instruction is used to instruct the UE to establish a first multiflow aggregation channel between the UE and the eNB via a non-3GPP network. The first multiflow aggregation channel is used for offloading a part of data in an uplink traffic flow of the UE or a part of data in a downlink traffic flow for the UE to the non-3GPP network for transmission, and other data in the uplink traffic flow or other data in the downlink traffic flow is offloaded to a 3GPP channel in the 3GPP network for transmission.

The establishment module 22 is configured to establish the first multiflow aggregation channel.

The receiving module 23 is configured to: receive a first uplink data flow sent by the UE by using the 3GPP channel, and receive a second uplink data flow sent by the UE by using the first multiflow aggregation channel.

The aggregation module 24 is configured to: aggregate the first uplink data flow with the second uplink data flow to form one traffic flow, and send the traffic flow. The uplink traffic flow of the UE is split by the UE into the first uplink data flow and the second uplink data flow.

Alternatively, the receiving module 23 is further configured to receive a downlink traffic flow sent by a core network of the 3GPP network.

The splitting module 25 is configured to split the downlink traffic flow into a first downlink data flow and a second downlink data flow.

The sending module 21 is further configured to: send the first downlink data flow to the UE by using the 3GPP channel, and send the second downlink data flow to the UE by using the first multiflow aggregation channel, so that the UE aggregates the first downlink data flow with the second downlink data flow to form one traffic flow.

The second uplink data flow includes a bearer identifier corresponding to the uplink traffic flow, or an identifier of the UE and a bearer identifier corresponding to the uplink traffic flow, or a first MAC address, or a second MAC address and a bearer identifier corresponding to the uplink traffic flow. The identifier of the UE is an identifier of the UE in the 3GPP network, the first MAC address is a MAC address corresponding to a bearer corresponding to the uplink traffic flow, and the second MAC address is a MAC address corresponding to a packet data network PDN connection corresponding to the uplink traffic flow. Before the aggregation module 24 aggregates the first uplink data flow with the second uplink data flow to form one traffic flow, and sends the traffic flow, the aggregation module 24 is further configured to: determine, according to information included in the second uplink data flow, a bearer corresponding to the second uplink data flow, and determine that a bearer corresponding to the first uplink data flow and the bearer corresponding to the second uplink data flow are a same bearer.

In this embodiment, when sending the second downlink data flow to the UE by using the first multiflow aggregation channel, the sending module 21 is specifically configured to:

add, to the second downlink data flow, a bearer identifier corresponding to the downlink traffic flow, and send the second downlink data flow to the UE by using the first multiflow aggregation channel, where the second downlink data flow includes the bearer identifier corresponding to the downlink traffic flow; or add, to the second downlink data flow, an identifier of the UE and a bearer identifier corresponding to the downlink traffic flow, and send the second downlink data flow to the UE by using the first multiflow aggregation channel, where the second downlink data flow includes the identifier of the UE and the bearer identifier corresponding to the downlink traffic flow; or encapsulate a data packet in the second downlink data flow by using a first MAC address, and send the encapsulated second downlink data flow to the UE by using the first multiflow aggregation channel, where the second downlink data flow includes the first MAC address; or encapsulate a data packet in the second downlink data flow by using a second MAC address, add, to the encapsulated second downlink data flow, a bearer identifier corresponding to the downlink traffic flow, and send the second downlink data flow to the UE by using the first multiflow aggregation channel, where the second downlink data flow includes the second MAC address and the bearer identifier corresponding to the downlink traffic flow.

Optionally, the receiving module 23 is further configured to receive a traffic flow template sent by an MME. The traffic flow template is corresponding to a bearer corresponding to the uplink traffic flow, each bearer is corresponding to one traffic flow template, and the traffic flow template includes matching information of the bearer corresponding to the uplink traffic flow. Before the aggregation module 24 aggregates the first uplink data flow with the second uplink data flow to form one traffic flow, and sends the traffic flow, the aggregation module 24 is further configured to: match the second uplink data flow and the traffic flow template, to determine a bearer corresponding to the second uplink data flow, and determine that the bearer corresponding to the second uplink data flow and a bearer corresponding to the first uplink data flow are a same bearer.

Optionally, the first multiflow aggregation channel includes a first subchannel between the UE and a multiflow aggregation gateway and a second subchannel between the multiflow aggregation gateway and the eNB, and the establishment module 22 is specifically configured to:

receive a third multiflow aggregation channel establishment request sent by the multiflow aggregation gateway, where the third multiflow aggregation channel establishment request is sent by the multiflow aggregation gateway to the eNB after the multiflow aggregation gateway receives a first multiflow aggregation channel establishment request sent by the UE, the first multiflow aggregation channel establishment request includes the identifier of the UE and a second multiflow aggregation instruction, the second multiflow aggregation instruction is used to instruct the multiflow aggregation gateway to establish the first multiflow aggregation channel, the third multiflow aggregation channel establishment request includes the identifier of the UE, a bearer identifier corresponding to the second subchannel, an endpoint identifier of a tunnel allocated to a bearer corresponding to the second subchannel, and the second multiflow aggregation instruction, and the identifier of the UE is the identifier of the UE in the 3GPP network;

return a second multiflow aggregation channel establishment response to the multiflow aggregation gateway, to determine that the second subchannel is successfully established, so that the multiflow aggregation gateway returns a first multiflow aggregation channel establishment response to the UE according to the second multiflow aggregation channel establishment response, to confirm that the first subchannel is successfully established; and receive a notification message sent by the UE, where the notification message is used to notify the eNB that the first multiflow aggregation channel is successfully established, and the notification message is sent by the UE to the eNB after the UE receives the first multiflow aggregation channel establishment response.

Optionally, the first multiflow aggregation channel includes a third subchannel between the UE and the eNB, and the establishment module 22 is specifically configured to:

receive a second multiflow aggregation channel establishment request sent by the UE, where second multiflow aggregation channel establishment request includes a second multiflow aggregation instruction and the identifier of the UE, the second multiflow aggregation instruction is used to instruct the eNB to establish the third subchannel, and the identifier of the UE is the identifier of the UE in the 3GPP network; and return a second multiflow aggregation channel establishment response to the UE, to confirm that the third subchannel is successfully established.

If the UE subsequently establishes a dedicated bearer, after the UE establishes the dedicated bearer, the sending module 21 is further configured to send a third multiflow aggregation instruction to the UE. The third multiflow aggregation instruction is used to instruct the UE to establish, for the dedicated bearer, a second multiflow aggregation channel between the UE and the eNB via the non-3GPP network. The second multiflow aggregation channel is used for transmitting a part of data in an uplink traffic flow transmitted on the dedicated bearer or a part of data in a downlink traffic flow transmitted on the dedicated bearer, where the part of data is offloaded to the non-3GPP network for transmission, and other data in the uplink traffic flow transmitted on the dedicated bearer or other data in the downlink traffic flow transmitted on the dedicated bearer is offloaded to the 3GPP channel for transmission. Correspondingly, the establishment module 22 is further configured to establish the second multiflow aggregation channel.

The eNB in this embodiment can be used to perform the methods provided in Embodiment 3, and Embodiment 5 to Embodiment 9. Specific implementations and technical effects thereof are similar to those of the methods, and details are not described herein.

Figure 16:
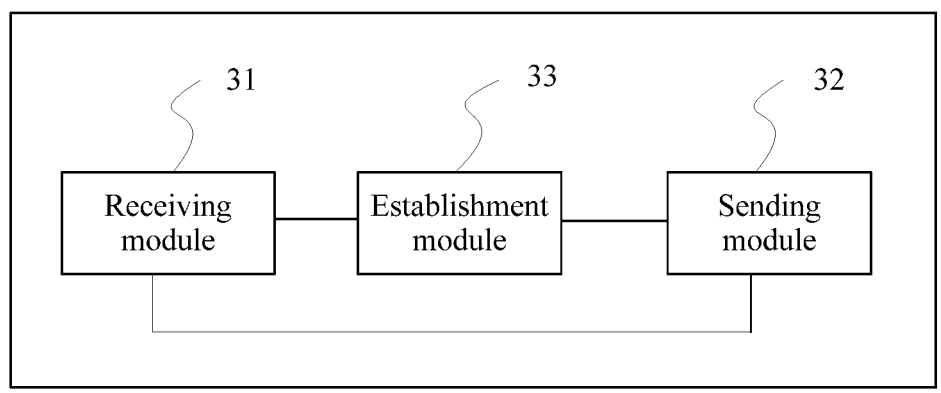
FIG. 16 is a schematic structural diagram of a multiflow aggregation gateway according to Embodiment 12 of the present invention.

FIG. 16 is a schematic structural diagram of a multiflow aggregation gateway according to Embodiment 12 of the present invention. As shown in FIG. 16, the multiflow aggregation gateway provided in this embodiment includes: a receiving module 31, a sending module 32, and an establishment module 33.

The receiving module 31 is configured to receive a first multiflow aggregation channel establishment request sent by UE. The first multiflow aggregation channel establishment request includes a second multiflow aggregation instruction and an identifier of the UE. The second multiflow aggregation instruction is used to instruct the multiflow aggregation gateway to establish a first multiflow aggregation channel between the UE and an eNB in a 3GPP network. The first multiflow aggregation channel is used for transmitting a part of data in an uplink traffic flow of the UE or a part of data in a downlink traffic flow for the UE, where the part of data is offloaded to a non-3GPP network for transmission, and other data in the uplink traffic flow or other data in the downlink traffic flow is offloaded to a 3GPP channel in the 3GPP network for transmission. The first multiflow aggregation channel includes a first subchannel between the UE and the multiflow aggregation gateway and a second subchannel between the multiflow aggregation gateway and the eNB. The identifier of the UE is an identifier of the UE in the 3rd Generation Partnership Project 3GPP network.

The sending module 32 is configured to return a first multiflow aggregation channel establishment response to the UE, to confirm that the first multiflow aggregation channel is successfully established.

Optionally, the first multiflow aggregation channel establishment request further includes a bearer identifier corresponding to the second subchannel, and the establishment module 33 is configured to:

before the sending module 32 returns the first multiflow aggregation channel establishment response to the UE, allocate, according to the bearer identifier corresponding to the second subchannel, a tunnel to a bearer corresponding to the second subchannel;

send a third multiflow aggregation channel establishment request to the eNB, where the third multiflow aggregation channel establishment request includes the second multiflow aggregation instruction, the bearer identifier corresponding to the second subchannel, the identifier of the UE, and an endpoint identifier of the tunnel allocated to the bearer corresponding to the second subchannel; and receive a third multiflow aggregation channel establishment response returned by the eNB, to determine that the second subchannel is successfully established.

Optionally, the second subchannel is an IP channel or a preconfigured private IP channel.

After the first multiflow aggregation channel is established, the receiving module 31 is further configured to receive a second uplink data flow sent by the UE by using the first subchannel. The uplink traffic flow of the UE is split by the UE into the second uplink data flow and a first uplink data flow, and the first uplink data flow is sent to the eNB by using the 3GPP channel. Correspondingly, the sending module 32 is further configured to send the second uplink data flow to the eNB by using the second subchannel.

Alternatively, the receiving module 31 is further configured to receive a second downlink data flow sent by the eNB by using the second subchannel. The downlink traffic flow for the UE is split by the eNB into a first downlink data flow and the second downlink data flow, and the first downlink data flow is sent to the eNB by using the 3GPP channel. Correspondingly, the sending module 32 is further configured to send the second downlink data flow to the UE by using the first subchannel.

Optionally, before sending the second uplink data flow to the eNB by using the second subchannel, the sending module 32 is further configured to: determine, according to information included in the second uplink data flow, a bearer corresponding to the second uplink data flow. The information included in the second uplink data flow is a bearer identifier corresponding to the uplink traffic flow, or the identifier of the UE and a bearer identifier corresponding to the uplink traffic flow. The identifier of the UE is the identifier of the UE in the 3GPP network. The sending module 32 is specifically configured to send the second uplink data flow to the eNB by using the bearer corresponding to the second uplink data flow.

Optionally, before sending the second downlink data flow to the UE by using the first subchannel, the sending module 32 is further configured to: determine, according to a bearer corresponding to the second downlink data flow passes, a bearer corresponding to the second downlink data flow, where the bearer corresponding to the second downlink data flow is the same as a bearer corresponding to the downlink traffic flow; and add, to the second downlink data flow, a bearer identifier corresponding to the second downlink data flow, where the second downlink data flow includes the bearer identifier corresponding to the second downlink data flow.

The multiflow aggregation gateway provided in this embodiment can be used to perform the methods provided in Embodiment 4 to Embodiment 9. Specific implementations and technical effects thereof are similar to those of the methods, and details are not described herein.

Figure 17:
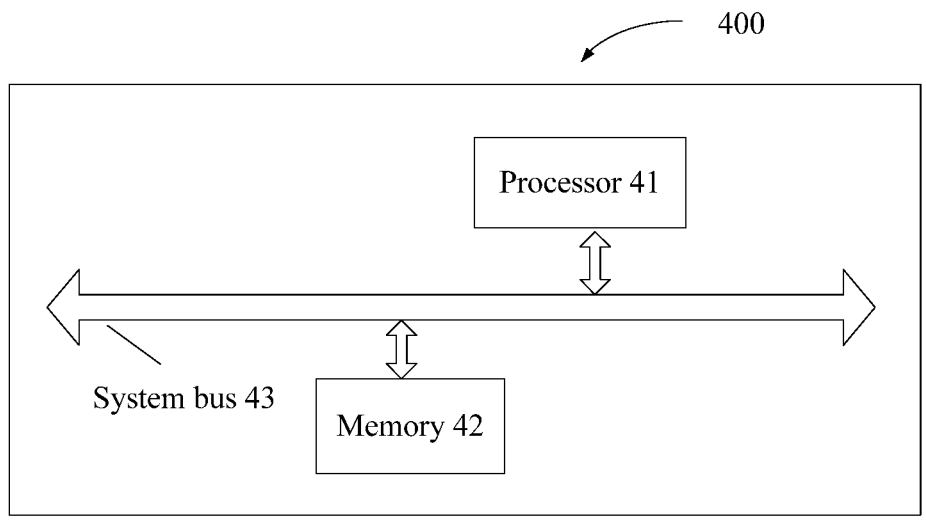
FIG. 17 is a schematic structural diagram of UE according to Embodiment 13 of the present invention.

FIG. 17 is a schematic structural diagram of UE according to Embodiment 13 of the present invention. As shown in FIG. 17, UE 400 provided in this embodiment includes: a processor 41, a memory 42, and a system bus 43. The processor 41 and the memory 42 are connected and communicate with each other by using the system bus 43. The memory 42 is configured to store a computer-executable instruction. The processor 41 is configured to run the computer-executable instruction to perform the following method:

receiving a first multiflow aggregation instruction sent by an eNB in a 3GPP network, where the first multiflow aggregation instruction is used to instruct the UE to establish a first multiflow aggregation channel between the UE and the eNB via a non-3GPP network, the first multiflow aggregation channel is used for transmitting a part of data in an uplink traffic flow of the UE or a part of data in a downlink traffic flow for the UE, where the part of data is offloaded to the non-3GPP network for transmission, and other data in the uplink traffic flow or other data in the downlink traffic flow is offloaded to a 3GPP channel in the 3GPP network for transmission; and establishing the first multiflow aggregation channel.

The processor 41 is further configured to: split the uplink traffic flow of the UE into a first uplink data flow and a second uplink data flow, send the first uplink data flow to the eNB by using the 3GPP channel, and send the second uplink data flow to the eNB by using the first multiflow aggregation channel, so that the eNB aggregates the first uplink data flow with the second uplink data flow to form one traffic flow; or receive a first downlink data flow sent by the eNB by using the 3GPP channel, receive a second downlink data flow sent by the eNB by using the first multiflow aggregation channel, and aggregate the first downlink data flow with the second downlink data flow to form one traffic flow, where the downlink traffic flow for the UE is split by the eNB into the first downlink data flow and the second downlink data flow.

Optionally, the first multiflow aggregation channel includes a first subchannel between the UE and a multiflow aggregation gateway and a second subchannel between the multiflow aggregation gateway and the eNB. That the processor 41 establishes the first multiflow aggregation channel is specifically: obtaining an IP address of the multiflow aggregation gateway; sending a first multiflow aggregation channel establishment request to the multiflow aggregation gateway according to the IP address of the multiflow aggregation gateway, where the first multiflow aggregation channel establishment request includes a second multiflow aggregation instruction and an identifier of the UE, the second multiflow aggregation instruction is used to instruct the multiflow aggregation gateway to establish the first multiflow aggregation channel, and the identifier of the UE is an identifier of the UE in the 3GPP network; receiving a first multiflow aggregation channel establishment response returned by the multiflow aggregation gateway, to confirm that the multiflow aggregation channel is successfully established; and sending a notification message to the eNB, where the notification message is used to notify the eNB that the first multiflow aggregation channel is successfully established.

That the processor 41 obtains an IP address of the multiflow aggregation gateway is specifically:

receiving, in an RRC connection establishment process, an RRC message sent by the eNB, and obtaining the IP address of the multiflow aggregation gateway according to the RRC message, where the RRC message includes the IP address of the multiflow aggregation gateway or an identifier of the multiflow aggregation gateway; or receiving, by the UE in an access authentication and authorization of accessing the non-3GPP network, an authentication message sent by the non-3GPP network, and obtaining the IP address of the multiflow aggregation gateway according to the authentication message, where the authentication message includes the IP address of the multiflow aggregation gateway or an identifier of the multiflow aggregation gateway; or sending, by the UE, a fully-qualified domain name request to a domain name server, and receiving a fully-qualified domain name response returned by the domain name server, where the fully-qualified domain name request is used for obtaining the IP address of the multiflow aggregation gateway, and the fully-qualified domain name response includes the IP address of the multiflow aggregation gateway.

Optionally, the first multiflow aggregation channel includes a third subchannel between the UE and the eNB. That the processor 41 establishes the first multiflow aggregation channel is specifically: obtaining an IP address of the eNB; sending a second multiflow aggregation channel establishment request to the eNB according to the IP address of the eNB, where the second multiflow aggregation channel establishment request includes a third multiflow aggregation instruction and an identifier of the UE, the third multiflow aggregation instruction is used to instruct the eNB to establish the first multiflow aggregation channel, and the identifier of the UE is an identifier of the UE in the 3GPP network; and receiving a second multiflow aggregation channel establishment response returned by the eNB, to confirm that the first multiflow aggregation channel is successfully established.

That the processor 41 sends the second uplink data flow to the eNB by using the first multiflow aggregation channel is specifically:

adding, to the second uplink data flow, a bearer identifier corresponding to the uplink traffic flow, and sending the second uplink data flow to the eNB by using the first multiflow aggregation channel, where the second uplink data flow includes the bearer identifier corresponding to the uplink traffic flow; or adding, to the second uplink data flow, the identifier of the UE and a bearer identifier corresponding to the uplink traffic flow, and sending the second uplink data flow to the eNB by using the first multiflow aggregation channel, where the second uplink data flow includes the identifier of the UE and the bearer identifier corresponding to the uplink traffic flow; or encapsulating, by the UE, a data packet in the second uplink data flow by using a first MAC address, and sending the encapsulated second uplink data flow to the eNB by using the first multiflow aggregation channel, where the second uplink data flow includes the first MAC address, and the first MAC address is a MAC address corresponding to a bearer corresponding to the uplink traffic flow; or encapsulating, by the UE, a data packet in the second uplink data flow by using a second MAC address, adding, to the encapsulated second uplink data flow, a bearer identifier corresponding to the uplink traffic flow, and sending the second uplink data flow to the eNB by using the first multiflow aggregation channel, where the second uplink data flow includes the second MAC address and the bearer identifier corresponding to the uplink traffic flow, and the second MAC address is a MAC address corresponding to a packet data network PDN connection corresponding to the uplink traffic flow.

In this embodiment, the second downlink data flow that is sent by the eNB by using the first multiflow aggregation channel and is received by the UE includes a bearer identifier corresponding to the downlink traffic flow, or the identifier of the UE and a bearer identifier corresponding to the downlink traffic flow, or a first MAC address, or a second MAC address and a bearer identifier corresponding to the downlink traffic flow. Before the processor 41 aggregates the first downlink data flow with the second downlink data flow to form one traffic flow, the processor 41 is further configured to: determine, according to information included in the second downlink data flow, a bearer corresponding to the second downlink data flow, and determine that a bearer corresponding to the first downlink data flow and the bearer corresponding to the second downlink data flow are a same bearer.

Optionally, the processor 41 is further configured to receive a traffic flow template sent by an MME in the 3GPP network. The traffic flow template is corresponding to a bearer corresponding to the downlink traffic flow, each bearer is corresponding to one traffic flow template, and the traffic flow template includes matching information of the bearer corresponding to the downlink traffic flow. Before the processor 41 aggregates the first downlink data flow with the second downlink data flow to form one traffic flow, the processor 41 is further configured to: match the second downlink data flow and the traffic flow template, to determine a bearer corresponding to the second downlink data flow, and determine that a bearer corresponding to the first downlink data flow and a bearer corresponding to the second downlink data flow passes are a same bearer.

If the UE further establishes a dedicated bearer, after the UE establishes the dedicated bearer, the processor 41 is further configured to: receive a fourth multiflow aggregation instruction sent by the eNB, where the fourth multiflow aggregation instruction is used to instruct the UE to establish, for the dedicated bearer, a second multiflow aggregation channel between the UE and the eNB via the non-3GPP network, the second multiflow aggregation channel is used for transmitting a part of data in an uplink traffic flow transmitted on the dedicated bearer or a part of data in a downlink traffic flow transmitted on the dedicated bearer, where the part of data is offloaded to the non-3GPP network for transmission, and other data in the uplink traffic flow transmitted on the dedicated bearer or other data in the downlink traffic flow transmitted on the dedicated bearer is offloaded to the 3GPP channel for transmission; and establish the second multiflow aggregation channel.

Optionally, before receiving the first multiflow aggregation instruction sent by the eNB, the processor 41 is further configured to send multiflow aggregation capability information of the UE to the eNB, so that the eNB determines, according to the multiflow aggregation capability information, whether to return the multiflow aggregation instruction to the UE. The multiflow aggregation capability information is used to indicate whether the UE supports a multiflow aggregation capability.

The UE provided in this embodiment can be used to perform the methods provided in Embodiment 1, Embodiment 2, and Embodiment 5 to Embodiment 9. Specific implementations and technical effects thereof are similar to those of the methods, and details are not described herein.

Figure 18:
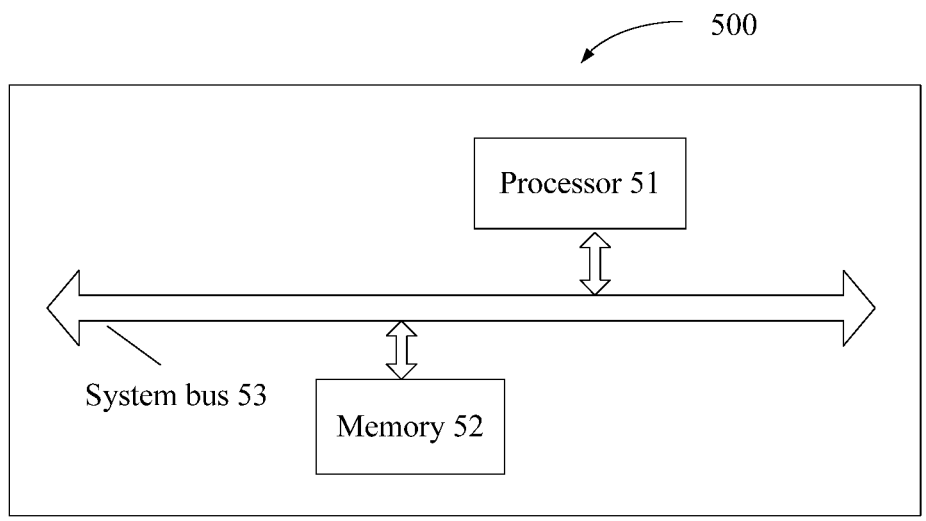
FIG. 18 is a schematic structural diagram of an eNB according to Embodiment 14 of the present invention.

FIG. 18 is a schematic structural diagram of an eNB according to Embodiment 14 of the present invention. As shown in FIG. 18, an eNB 500 provided in this embodiment includes: a processor 51, a memory 52, and a system bus 53. The processor 51 and the memory 52 are connected and communicate with each other by using the system bus 53. The memory 52 is configured to store a computer-executable instruction. The processor 51 is configured to run the computer-executable instruction to perform the following method:

sending a first multiflow aggregation instruction to UE, where the first multiflow aggregation instruction is used to instruct the UE to establish a first multiflow aggregation channel between the UE and the eNB via a non-3rd Generation Partnership Project 3GPP network, the first multiflow aggregation channel is used for offloading a part of data in an uplink traffic flow of the UE or a part of data in a downlink traffic flow for the UE to the non-3GPP network for transmission, and other data in the uplink traffic flow or other data in the downlink traffic flow is offloaded to a 3GPP channel in a 3GPP network for transmission; and establishing the first multiflow aggregation channel.

The processor 51 is further configured to: after establishing the first multiflow aggregation channel, receive a first uplink data flow sent by the UE by using the 3GPP channel, receive a second uplink data flow sent by the UE by using the first multiflow aggregation channel, aggregate the first uplink data flow with the second uplink data flow to form one traffic flow, and send the traffic flow, where the uplink traffic flow of the UE is split by the UE into the first uplink data flow and the second uplink data flow; or receive a downlink traffic flow sent by a core network of the 3GPP network, split the downlink traffic flow into a first downlink data flow and a second downlink data flow, send the first downlink data flow to the UE by using the 3GPP channel, and send the second downlink data flow to the UE by using the first multiflow aggregation channel, so that the UE aggregates the first downlink data flow with the second downlink data flow to form one traffic flow.

The second uplink data flow includes a bearer identifier corresponding to the uplink traffic flow, or an identifier of the UE and a bearer identifier corresponding to the uplink traffic flow, or a first MAC address, or a second MAC address and a bearer identifier corresponding to the uplink traffic flow. The identifier of the UE is an identifier of the UE in the 3GPP network, the first MAC address is a MAC address corresponding to a bearer corresponding to the uplink traffic flow, and the second MAC address is a MAC address corresponding to a packet data network PDN connection corresponding to the uplink traffic flow. Before the processor 51 aggregates the first uplink data flow with the second uplink data flow to form one traffic flow, and sends the traffic flow, the processor 51 is further configured to: determine, according to information included in the second uplink data flow, a bearer corresponding to the second uplink data flow, and determine that a bearer corresponding to the first uplink data flow and the bearer corresponding to the second uplink data flow are a same bearer.

That the processor 51 sends the second downlink data flow to the UE by using the first multiflow aggregation channel is specifically: adding, to the second downlink data flow, a bearer identifier corresponding to the downlink traffic flow, and sending the second downlink data flow to the UE by using the first multiflow aggregation channel; or adding, to the second downlink data flow, an identifier of the UE and a bearer identifier corresponding to the downlink traffic flow, and sending the second downlink data flow to the UE by using the first multiflow aggregation channel, where the second downlink data flow includes the identifier of the UE and the bearer identifier corresponding to the downlink traffic flow; or encapsulating a data packet in the second downlink data flow by using a first MAC address, and sending the encapsulated second downlink data flow to the UE by using the first multiflow aggregation channel, where the second downlink data flow includes the first MAC address; or encapsulating a data packet in the second downlink data flow by using a second MAC address, adding, to the encapsulated second downlink data flow, a bearer identifier corresponding to the downlink traffic flow, and sending the second downlink data flow to the UE by using the first multiflow aggregation channel, where the second downlink data flow includes the second MAC address and the bearer identifier corresponding to the downlink traffic flow.

Optionally, the processor 51 is further configured to receive a traffic flow template sent by an MME. The traffic flow template is corresponding to a bearer corresponding to the uplink traffic flow, each bearer is corresponding to one traffic flow template, and the traffic flow template includes matching information of the bearer corresponding to the uplink traffic flow. Before aggregating the first uplink data flow with the second uplink data flow to form one traffic flow, and sends the traffic flow, the processor 51 is further configured to: match the second uplink data flow and the traffic flow template, to determine a bearer corresponding to the second uplink data flow, and determine that the bearer corresponding to the second uplink data flow and a bearer corresponding to the first uplink data flow are a same bearer.

Optionally, the first multiflow aggregation channel includes a first subchannel between the UE and a multiflow aggregation gateway and a second subchannel between the multiflow aggregation gateway and the eNB. That the processor 51 establishes the first multiflow aggregation channel is specifically:

first, receiving a third multiflow aggregation channel establishment request sent by the multiflow aggregation gateway, where the third multiflow aggregation channel establishment request is sent by the multiflow aggregation gateway to the eNB after the multiflow aggregation gateway receives a first multiflow aggregation channel establishment request sent by the UE, the first multiflow aggregation channel establishment request includes the identifier of the UE and a second multiflow aggregation instruction, the second multiflow aggregation instruction is used to instruct the multiflow aggregation gateway to establish the first multiflow aggregation channel, the third multiflow aggregation channel establishment request includes the identifier of the UE, a bearer identifier corresponding to the second subchannel, an endpoint identifier of a tunnel allocated to a bearer corresponding to the second subchannel, and the second multiflow aggregation instruction, and the identifier of the UE is the identifier of the UE in the 3GPP network;

then, returning a second multiflow aggregation channel establishment response to the multiflow aggregation gateway, to determine that the second subchannel is successfully established, so that the multiflow aggregation gateway returns a first multiflow aggregation channel establishment response to the UE according to the second multiflow aggregation channel establishment response, to confirm that the first subchannel is successfully established; and finally, receiving a notification message sent by the UE, where the notification message is used to notify the eNB that the first multiflow aggregation channel is successfully established, and the notification message is sent by the UE to the eNB after the UE receives the first multiflow aggregation channel establishment response.

Optionally, the first multiflow aggregation channel includes a third subchannel between the UE and the eNB. That the processor 51 establishes the first multiflow aggregation channel is specifically: receiving a second multiflow aggregation channel establishment request sent by the UE, where the second multiflow aggregation channel establishment request includes a second multiflow aggregation instruction and the identifier of the UE, the second multiflow aggregation instruction is used to instruct the eNB to establish the third subchannel, and the identifier of the UE is the identifier of the UE in the 3GPP network; and returning a second multiflow aggregation channel establishment response to the UE, to confirm that the third subchannel is successfully established.

If the UE further establishes a dedicated bearer, after the UE establishes the dedicated bearer, the processor 51 is further configured to: send a third multiflow aggregation instruction to the UE, where the third multiflow aggregation instruction is used to instruct the UE to establish, for the dedicated bearer, a second multiflow aggregation channel between the UE and the eNB via the non-3GPP network, the second multiflow aggregation channel is used for transmitting a part of data in an uplink traffic flow transmitted on the dedicated bearer or a part of data in a downlink traffic flow transmitted on the dedicated bearer, where the part of data is offloaded to the non-3GPP network for transmission, and other data in the uplink traffic flow transmitted on the dedicated bearer or other data in the downlink traffic flow transmitted on the dedicated bearer is offloaded to the 3GPP channel for transmission; and establish the second multiflow aggregation channel.

The eNB provided in this embodiment can be used to perform the methods provided in Embodiment 3, and Embodiment 5 to Embodiment 9. Specific implementations and technical effects thereof are similar to those of the methods, and details are not described herein.

Figure 19:
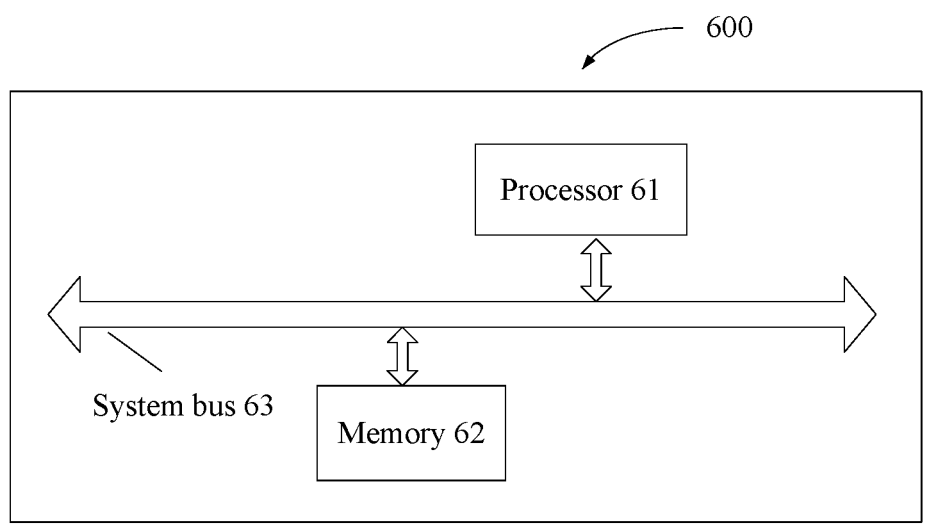
FIG. 19 is a schematic structural diagram of a multiflow aggregation gateway according to Embodiment 15 of the present invention.

FIG. 19 is a schematic structural diagram of a multiflow aggregation gateway according to Embodiment 15 of the present invention. As shown in FIG. 19, a multiflow aggregation gateway 600 provided in this embodiment includes: a processor 61, a memory 62, and a system bus 63. The processor 61 and the memory 62 are connected and communicate with each other by using the system bus 63. The memory 62 is configured to store a computer-executable instruction. The processor 61 is configured to run the computer-executable instruction to perform the following method:

receiving a first multiflow aggregation channel establishment request sent by UE, where the first multiflow aggregation channel establishment request includes a second multiflow aggregation instruction and an identifier of the UE, the second multiflow aggregation instruction is used to instruct the multiflow aggregation gateway to establish a first multiflow aggregation channel between the UE and an eNB in a 3GPP network, the first multiflow aggregation channel is used for transmitting a part of data in an uplink traffic flow of the UE or a part of data in a downlink traffic flow for the UE, where the part of data is offloaded to a non-3GPP network for transmission, other data in the uplink traffic flow or other data in the downlink traffic flow is offloaded to a 3GPP channel in the 3GPP network for transmission, the first multiflow aggregation channel includes a first subchannel between the UE and the multiflow aggregation gateway and a second subchannel between the multiflow aggregation gateway and the eNB, and the identifier of the UE is an identifier of the UE in the 3rd Generation Partnership Project 3GPP network; and returning a first multiflow aggregation channel establishment response to the UE, to confirm that the first multiflow aggregation channel is successfully established.

Optionally, the first multiflow aggregation channel establishment request further includes a bearer identifier corresponding to the second subchannel. Before returning the first multiflow aggregation channel establishment response to the UE, the processor 61 is further configured to: allocate, according to the bearer identifier corresponding to the second subchannel, a tunnel to a bearer corresponding to the second subchannel; send a third multiflow aggregation channel establishment request to the eNB, where the third multiflow aggregation channel establishment request includes the second multiflow aggregation instruction, the bearer identifier corresponding to the second subchannel, the identifier of the UE, and an endpoint identifier of the tunnel allocated to the bearer corresponding to the second subchannel; and receive a third multiflow aggregation channel establishment response returned by the eNB, to determine that the second subchannel is successfully established.

Optionally, the second subchannel is a device-level Internet Protocol IP channel or a preconfigured private IP channel.

After successfully establishing the first multiflow aggregation channel, the processor 61 is further configured to: receive a second uplink data flow sent by the UE by using the first subchannel, and send the second uplink data flow to the eNB by using the second subchannel, where the uplink traffic flow of the UE is split by the UE into the second uplink data flow and a first uplink data flow, and the first uplink data flow is sent to the eNB by using the 3GPP channel; or receive a second downlink data flow sent by the eNB by using the second subchannel, and send the second downlink data flow to the UE by using the first subchannel, where the downlink traffic flow for the UE is split by the eNB into a first downlink data flow and the second downlink data flow, and the first downlink data flow is sent to the eNB by using the 3GPP channel.

Before sending the second uplink data flow to the eNB by using the second subchannel, the processor 61 is further configured to determine, according to information included in the second uplink data flow, a bearer corresponding to the second uplink data flow. The information included in the second uplink data flow is a bearer identifier corresponding to the uplink traffic flow, or the identifier of the UE and a bearer identifier corresponding to the uplink traffic flow. The identifier of the UE is the identifier of the UE in the 3GPP network. Correspondingly, that the processor 61 sends the second uplink data flow to the eNB by using the second subchannel is specifically: sending the second uplink data flow to the eNB by using the bearer corresponding to the second uplink data flow.

Before sending the second downlink data flow to the UE by using the first subchannel, the processor 61 is further configured to: determine, according to a bearer corresponding to the second downlink data flow passes, a bearer corresponding to the second downlink data flow, where the bearer corresponding to the second downlink data flow is the same as a bearer corresponding to the downlink traffic flow; and add, to the second downlink data flow, a bearer identifier corresponding to the second downlink data flow, where the second downlink data flow includes the bearer identifier corresponding to the second downlink data flow.

The multiflow aggregation gateway provided in this embodiment can be used to perform the methods provided in Embodiment 4 to Embodiment 9. Specific implementations and technical effects thereof are similar to those of the methods, and details are not described herein.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that, the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method of traffic flow splitting, comprising:
receiving, by user equipment (UE), a first multiflow aggregation instruction from an evolved NodeB (eNB) in a 3rd Generation Partnership Project (3GPP) network, wherein the first multiflow aggregation instruction is used to instruct the UE to establish a first multiflow aggregation channel between the UE and the eNB via a non-3GPP network, the first multiflow aggregation channel is used for transmitting a part of data in a downlink traffic flow for the UE, wherein the part of data is offloaded to the non-3GPP network for transmission, and other data in the downlink traffic flow is offloaded to a 3GPP channel that is in the 3GPP network and that is between the UE and the eNB for transmission, the first multiflow aggregation channel comprises a first subchannel between the UE and a multiflow aggregation gateway and a second subchannel between the multiflow aggregation gateway and the eNB; and
establishing, by the UE, the first multiflow aggregation channel, comprising:
obtaining, by the UE, an IP address of the multiflow aggregation gateway; and
sending, by the UE, a first multiflow aggregation channel establishment request to the multiflow aggregation gateway according to the IP address of the multiflow aggregation gateway, wherein the first multiflow aggregation channel establishment request comprises a second multiflow aggregation instruction and a bearer identifier corresponding to the second subchannel, the second multiflow aggregation instruction is used to instruct the multiflow aggregation gateway to establish the first multiflow aggregation channel.

2. The method according to claim 1, wherein the method further comprises:
receiving, by the UE, a first downlink data flow sent by the eNB by using the 3GPP channel;
receiving, by the UE, a second downlink data flow sent by the eNB by using the first multiflow aggregation channel; and
aggregating, by the UE, the first downlink data flow with the second downlink data flow to form one traffic flow.

3. The method according to claim 2, wherein the second downlink data flow comprises a bearer identifier corresponding to the downlink traffic flow.

4. The method according to claim 3, wherein before the aggregating, by the UE, the first downlink data flow with the second downlink data flow to form one traffic flow, the method further comprises:
determining, by the UE according to information comprised in the second downlink data flow, a bearer corresponding to the second downlink data flow, wherein the information comprised in the second downlink data flow is the bearer identifier corresponding to the downlink traffic flow; and
determining, by the UE, that a bearer corresponding to the first downlink data flow and the bearer corresponding to the second downlink data flow are a same bearer.

5. The method according to claim 1, wherein before the receiving, by UE, the first multiflow aggregation instruction sent by the eNB, the method further comprises:
sending, by the UE, multiflow aggregation capability information of the UE to the eNB, wherein the multiflow aggregation capability information is used to indicate that the UE supports a multiflow aggregation capability.

6. User equipment (UE), comprising:
a memory, configured to store a computer-executable instruction; and
a processor, configured to execute the computer-executable instruction to perform the operation comprising:
receiving a first multiflow aggregation instruction cent from an evolved NodeB (eNB) in a 3rd Generation Partnership Project (3GPP) network, wherein the first multiflow aggregation instruction is used to instruct the UE to establish a first multiflow aggregation channel between the UE and the eNB via a non-3GPP network, the first multiflow aggregation channel is used for transmitting a part of data in a downlink traffic flow for the UE, wherein the part of data is offloaded to the non-3GPP network for transmission, and other data in the downlink traffic flow is offloaded to a 3GPP channel that is in the 3GPP network and that is between the UE and the eNB for transmission, the first multiflow aggregation channel comprises a first subchannel between the UE and a multiflow aggregation gateway and a second subchannel between the multiflow aggregation gateway and the eNB; and
establishing the first multiflow aggregation channel, comprising:
obtaining, by the UE, an IP address of the multiflow aggregation gateway; and
sending, by the UE, a first multiflow aggregation channel establishment request to the multiflow aggregation gateway according to the IP address of the multiflow aggregation gateway, wherein the first multiflow aggregation channel establishment request comprises a second multiflow aggregation instruction and a bearer identifier corresponding to the second subchannel, the second multiflow aggregation instruction is used to instruct the multiflow aggregation gateway to establish the first multiflow aggregation channel.

7. The UE according to claim 6, wherein the operation further comprises:
receiving a first downlink data flow sent from the eNB by using the 3GPP channel;
receiving a second downlink data flow sent from the eNB by using the first multiflow aggregation channel; and
aggregating the first downlink data flow with the second downlink data flow to form one traffic flow.

8. The UE according to claim 7, wherein the first multiflow aggregation channel comprises a bearer identifier corresponding to the downlink traffic flow.

9. The UE according to claim 8, wherein before the aggregating the first downlink data flow with the second downlink data flow to form one traffic flow, the operation further comprises:

determining, according to information comprised in the second downlink data flow, a bearer corresponding to the second downlink data flow, wherein the information comprised in the second downlink data flow is the bearer identifier corresponding to the downlink traffic flow; and determining that a bearer corresponding to the first downlink data flow and the bearer corresponding to the second downlink data flow are a same bearer.

10. The UE according to claim 6, wherein before the receiving the first multiflow aggregation instruction sent from the eNB, the operation further comprises:

sending multiflow aggregation capability information of the UE to the eNB, wherein the multiflow aggregation capability information is used to indicate that the UE supports a multiflow aggregation capability.

\* \* \* \* \*